US010700536B2

(12) United States Patent
Kubota

(10) Patent No.: US 10,700,536 B2
(45) Date of Patent: Jun. 30, 2020

(54) CONTROL DEVICE, BALANCE CORRECTING SYSTEM, ELECTRIC STORAGE SYSTEM AND DEVICE

(71) Applicant: NExT-e Solutions Inc., Tokyo (JP)

(72) Inventor: Haruhiko Kubota, Kanagawa (JP)

(73) Assignee: NExT-e Solutions Inc., Tokyo (JP)

( * ) Notice: Subject to any disclaimer, the term of this patent is extended or adjusted under 35 U.S.C. 154(b) by 387 days.

(21) Appl. No.: 15/841,289

(22) Filed: Dec. 13, 2017

(65) Prior Publication Data
US 2019/0103749 A1  Apr. 4, 2019

(30) Foreign Application Priority Data

Sep. 29, 2017 (JP) .................................. 2017-191233

(51) Int. Cl.
*H02J 7/00* (2006.01)
(52) U.S. Cl.
CPC .......... *H02J 7/0026* (2013.01); *H02J 7/0014* (2013.01); *H02J 7/0016* (2013.01); *H02J 7/0019* (2013.01); *H02J 7/0021* (2013.01)
(58) Field of Classification Search
CPC ...... H02J 7/0026; H02J 7/0021; H02J 7/0019; H02J 7/0014; H02J 7/0016
USPC ................................................ 320/116–123
See application file for complete search history.

(56) References Cited

U.S. PATENT DOCUMENTS

| 7,728,553 | B2 * | 6/2010 | Carrier | H02J 7/0021 320/119 |
| 9,035,611 | B2 * | 5/2015 | Kikuchi | B60L 11/1853 320/116 |
| 9,172,258 | B2 * | 10/2015 | Song | H02J 7/0016 |
| 2013/0057198 | A1 | 3/2013 | Gerlovin | |
| 2014/0145669 | A1 | 5/2014 | Wortham | |
| 2015/0326041 | A1 * | 11/2015 | Hamada | H01M 10/46 320/103 |
| 2015/0357842 | A1 | 12/2015 | Bailly et al. | |

FOREIGN PATENT DOCUMENTS

| JP | 2006067742 A | 3/2006 |
| JP | 2008017605 A | 1/2008 |
| JP | 2009232660 A | 10/2009 |

* cited by examiner

*Primary Examiner* — Richard V Muralidar

(57) ABSTRACT

A control device includes: a first path for: electrically connecting (i) a power source unit or reference potential that provides a potential, voltage or current for generating a drive signal of a switching element and (ii) a receiving unit that receives the drive signal in the switching element; and supplying the drive signal to the switching element; and a second path for: electrically connecting (i) the power source unit or the reference potential and (ii) the receiving unit; and supplying the drive signal to the switching element. (i) A value of a combined resistance of a wire of the second path and one or more elements disposed in the second path is greater than (ii) a value of a combined resistance of a wire of the first path and one or more elements disposed in the first path.

19 Claims, 8 Drawing Sheets

CONTROL DEVICE, BALANCE CORRECTING SYSTEM, ELECTRIC STORAGE SYSTEM AND DEVICE

BACKGROUND

1. Technical Field

The contents of the following Japanese patent application are incorporated herein by reference:

2017-191233 filed on Sep. 29, 2017

The present invention relates to a control device, a balance correcting system, an electric storage system and a device.

2. Related Art

When a large number of electric storage cells connected in series are used, if voltages of the electric storage cells vary from cell to cell, the quantity of available electricity decreases in some cases because the capacities of the electric storage cells cannot be used effectively. In view of this, an active balance correcting circuit (which is referred to as an active balancer or the like in some cases) that utilizes an inductor, transformer, capacitor or the like and a switching element to equalize voltages of a plurality of electric storage cells has been proposed (please see Patent Documents 1 to 3).

Patent Documents

[Patent Document 1] Japanese Patent Application Publication No. 2006-067742 [Patent Document 2] Japanese Patent Application Publication No. 2008-017605 [Patent Document 3] Japanese Patent Application Publication No. 2009-232660

For example, it is desirable to ensure safety of the balance correcting circuit even if an abnormality occurs to operation of the switching element or supply of a drive signal to drive the switching element, and a large current flows from the electric storage cells to part of the balance correcting circuit.

SUMMARY

A first aspect of the present invention provides a control device. The control device for example controls a balance correcting device to equalize voltages of a first electric storage cell and a second electric storage cell that are connected in series. The balance correcting device for example has a transporting device for transporting energy between the first electric storage cell and the second electric storage cell. The balance correcting device for example has a switching element that switches an electrical connection relationship between (i) at least either the first electric storage cell or the second electric storage cell and (ii) the transporting device. The control device for example includes a first path for: electrically connecting (i) a power source unit or reference potential that provides a potential, voltage or current for generating a drive signal of the switching element and (ii) a receiving unit that receives the drive signal in the switching element; and supplying the drive signal to the switching element. The control device for example includes a second path for: electrically connecting (i) the power source unit or the reference potential and (ii) the receiving unit; and supplying the drive signal to the switching element. In the control device, (i) a value of a combined resistance of a wire of the second path and one or more elements disposed in the second path is for example greater than (ii) a value of a combined resistance of a wire of the first path and one or more elements disposed in the first path.

The control device may include a first switching unit that (i) is disposed in the first path, and (ii) switches, in the first path, an electrical connection relationship between the power source unit or the reference potential and the receiving unit. The control device may include a control signal generating unit that generates a first control signal for controlling operation of the first switching unit. In the control device, if the balance correcting device executes an equalization operation, the control signal generating unit may generate the first control signal for controlling the first switching unit such that operation of the first switching unit results in generation of the drive signal for switching an ON-state and an OFF-state of the switching element.

The control device may include a second switching unit that (i) is disposed in the second path, and (ii) switches, in the second path, an electrical connection relationship between the power source unit or the reference potential and the receiving unit. In the control device, the control signal generating unit may generate a second control signal for controlling operation of the second switching unit. In the control device, if the balance correcting device deactivates an equalization operation, the control signal generating unit may generate: the first control signal for controlling the first switching unit such that operation of the first switching unit results in generation of the drive signal for making the switching element turned off; and the second control signal for controlling the second switching unit such that operation of the second switching unit results in generation of the drive signal for making the switching element turned off. In the control device, the control signal generating unit may generate the first control signal for controlling the first switching unit such that operation of the first switching unit results in generation of the drive signal for making the switching element turned off, and then generates the first control signal for controlling the first switching unit such that electrical connection established by the first switching unit between the power source unit or the reference potential and the receiving unit is disconnected in a state where the drive signal for making the switching element turned off as a result of operation of the second switching unit is being generated.

In the control device, the control signal generating unit may generate the second control signal for controlling the second switching unit such that operation of the first switching unit results in generation of the drive signal for making the switching element turned off, and then operation of the second switching unit results in generation of the drive signal for making the switching element turned off In the control device, a period of time after operation of the first switching unit results in generation of the drive signal for making the switching element turned off and until operation of the second switching unit results in generation of the drive signal for making the switching element turned off may be set based on a period of time after operation of the first switching unit results in generation of the drive signal for making the switching element turned off and until a state of the balance correcting device is stabilized.

The control device may include a second switching unit that (i) is disposed in the second path, and (ii) switches, in the second path, an electrical connection relationship between the power source unit or the reference potential and the receiving unit. In the control device, the control signal generating unit may further generate a second control signal for controlling operation of the second switching unit. In the control device, if having received, from an abnormality detecting unit that detects that an abnormality has occurred to the balance correcting device, a signal indicating that the abnormality has been detected, the control signal generating unit may generate: the first control signal for controlling the first switching unit such that electrical connection established by the first switching unit between the power source unit or the reference potential and the receiving unit is disconnected; and the second control signal for controlling the second switching unit such that operation of the second switching unit results in generation of the drive signal for making the switching element turned off.

In the control device, the first switching unit and the second switching unit may be transistors. In the control device, an ON-resistance of the second switching unit may be greater than an ON-resistance of the first switching unit. The control device may include a plurality of the first switching units disposed in parallel in the first path. In the control device, if having received, from an abnormality detecting unit that detects an abnormality has occurred to the balance correcting device, a signal indicating that the abnormality has been detected, the power source unit may reduce a voltage or current for generating the drive signal.

A second aspect of the present invention provides a control device. The control device for example controls a balance correcting device to equalize voltages of a first electric storage cell and a second electric storage cell that are connected in series. The balance correcting device for example has a transporting device for transporting energy between the first electric storage cell and the second electric storage cell. The balance correcting device for example has a switching element that switches an electrical connection relationship between (i) at least either the first electric storage cell or the second electric storage cell and (ii) the transporting device. The control device for example includes a power source unit that provides a potential, voltage or current for generating a drive signal of the switching element. The control device for example includes a first path for: electrically connecting (i) the power source unit and (ii) a receiving unit that receives the drive signal in the switching element; and supplying the drive signal to the switching element. In the control device, for example if having received, from an abnormality detecting unit that detects an abnormality has occurred to the balance correcting device, a signal indicating that an abnormality has been detected, the power source unit reduces a voltage or current for generating the drive signal.

A third aspect of the present invention provides a balance correcting system. The balance correcting system for example includes the control device according to the first aspect or second aspect; and the balance correcting device. The balance correcting system for example includes the balance correcting device.

A fourth aspect of the present invention provides an electric storage system. The electric storage system for example includes the balance correcting system according to the third aspect. The electric storage system for example includes the first electric storage cell and the second electric storage cell.

A fifth aspect of the present invention provides a device. The device for example includes the electric storage system according to the fourth aspect. The device for example includes at least either (i) a load that consumes electrical power supplied from the electric storage system or (ii) a charging facility for supplying electrical power from the electric storage system to another instrument.

The summary clause does not necessarily describe all necessary features of the embodiments of the present invention. The present invention may also be a sub-combination of the features described above.

DESCRIPTION OF EXEMPLARY EMBODIMENTS

Figure 1:
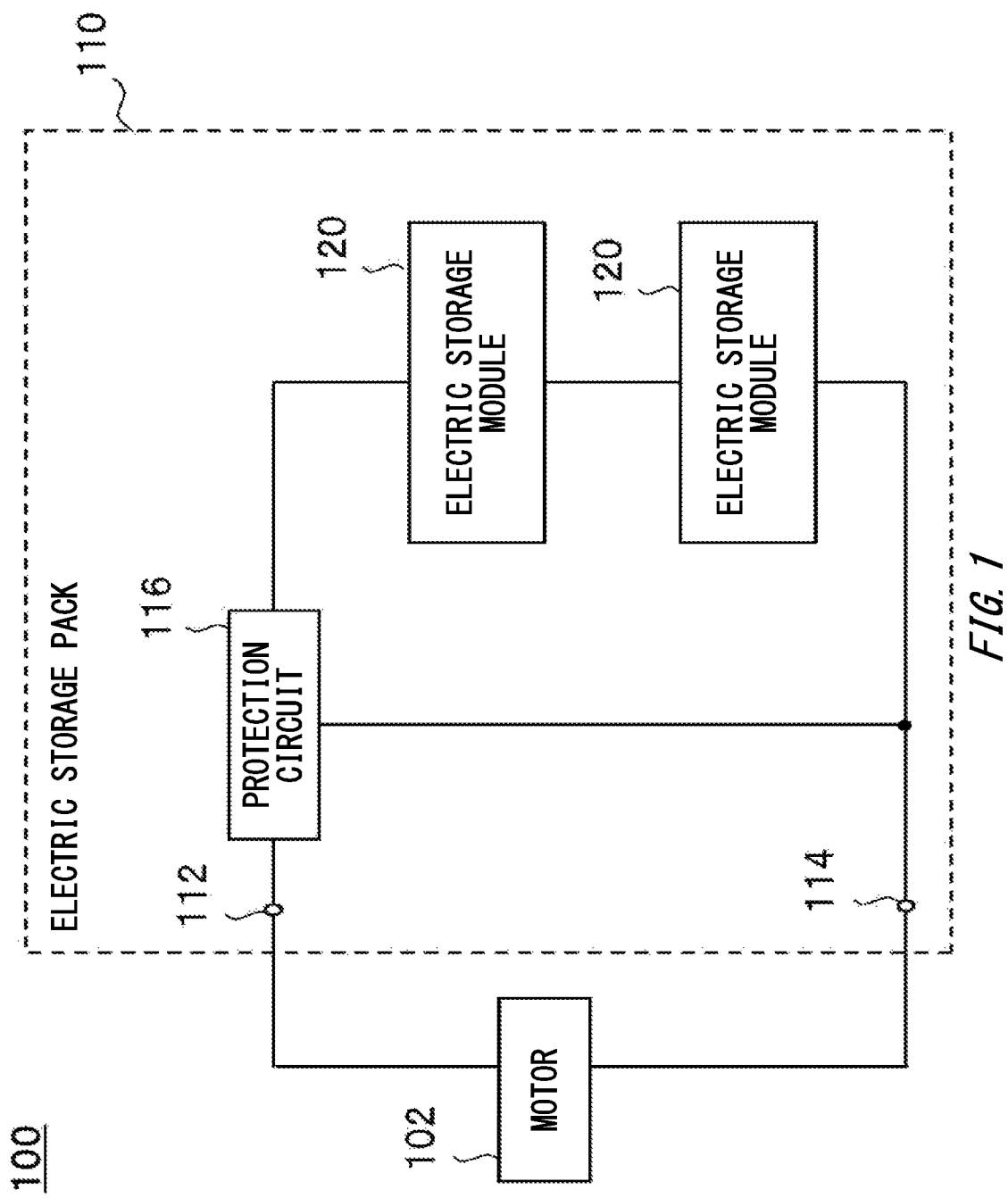
FIG. 1 schematically shows one example of a device 100 including an electric storage pack 110.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. Also, although embodiments are explained with reference to drawings, identical or analogous portions in the drawings are given identical reference numbers, and the same explanation is omitted in some cases.

FIG. 1 schematically shows one example of a device 100 including an electric storage pack 110. Configuration and operation of the device 100 and the electric storage pack 110 are explained using FIG. 1. In the present embodiment, the device 100 includes a motor 102 and the electric storage pack 110. The motor 102 is electrically connected with the electric storage pack 110 and consumes electrical power supplied from the electric storage pack 110. The motor 102 may be used as a regenerative brake. The motor 102 may be one example of a load.

In one embodiment, the electric storage pack 110 is electrically connected with the motor 102, and supplies electrical power to the motor 102 (which is referred to as discharging by an electric storage system in some cases). In another embodiment, the electric storage pack 110 is electrically connected with a charging device (not illustrated), and stores electrical energy supplied from the charging device (which is referred to as charging by an electric storage system in some cases).

The device 100 is not limited to the present embodiment. The device 100 for example includes at least either (i) a load that consumes electrical power supplied from the electric storage pack 110 or (ii) charging facilities for supplying electrical power from the electric storage pack 110 to another instrument. The device 100 may be a transporting device such as an electric car, a hybrid car, an electric motorcycle, a railway car or an elevator. The device 100 may be an electrical instrument such as a PC or a mobile phone. The device 100 may be a charging device.

As shown in FIG. 1, in the present embodiment, the electric storage pack 110 includes a terminal 112, a terminal 114, a protection circuit 116 and electric storage modules 120. The electric storage modules 120 may include a plurality of electric storage cells connected in series. The electric storage pack 110 may include a plurality of electric storage modules 120. The plurality of electric storage modules 120 may be disposed in series or may be disposed in parallel. The electric storage pack 110 and the electric storage modules 120 may be one example of an electric storage system.

Here, the phrase "electrically connected" refers to states not limited one in which an element and another element are directly connected. A third element may be interposed between an element and another element. Also, the phrase "electrically connected" refers to states not limited to one in which an element and another element are physically connected. For example, an input winding and output winding of a voltage converter are not connected physically, but are electrically connected. Furthermore, the phrase "electrically connected" refers to states not limited to one in which an element and another element are really electrically connected, but including one in which an element and another element are electrically connected if an electric storage cell and a balance correcting circuit are electrically connected.

The phrase "connected in series" refers to a state where an element and another element are electrically connected in series. Also, unless indicated otherwise, a "voltage difference" between electric storage cells means a value obtained by comparing voltages of two electric storage cells (which are referred to as inter-terminal voltages in some cases) and subtracting a voltage of one electric storage cell to which a lower voltage is applied from a voltage of the other electric storage cell to which a higher voltage is applied.

The terminal 112 and the terminal 114 electrically connect an instrument or device located outside a system such as the motor 102 or the charging device and the electric storage pack 110. The protection circuit 116 protects the electric storage modules 120 from at least one among overcurrent, overvoltage and overdischarge. The protection circuit 116 utilized can be a known overcurrent/overvoltage protection circuit like the one disclosed for example in Japanese Patent Application Publication No. 2009-183141.

In the present embodiment having been explained, the device 100 includes the motor 102, and the motor 102 consumes electrical power supplied from the electric storage pack 110. However, the device 100 is not limited to the present embodiment. In another embodiment, instead of the motor 102 or in addition to the motor 102, the device 100 may include charging facilities for supplying electrical power from the electric storage pack 110 to another instrument.

Figure 2:
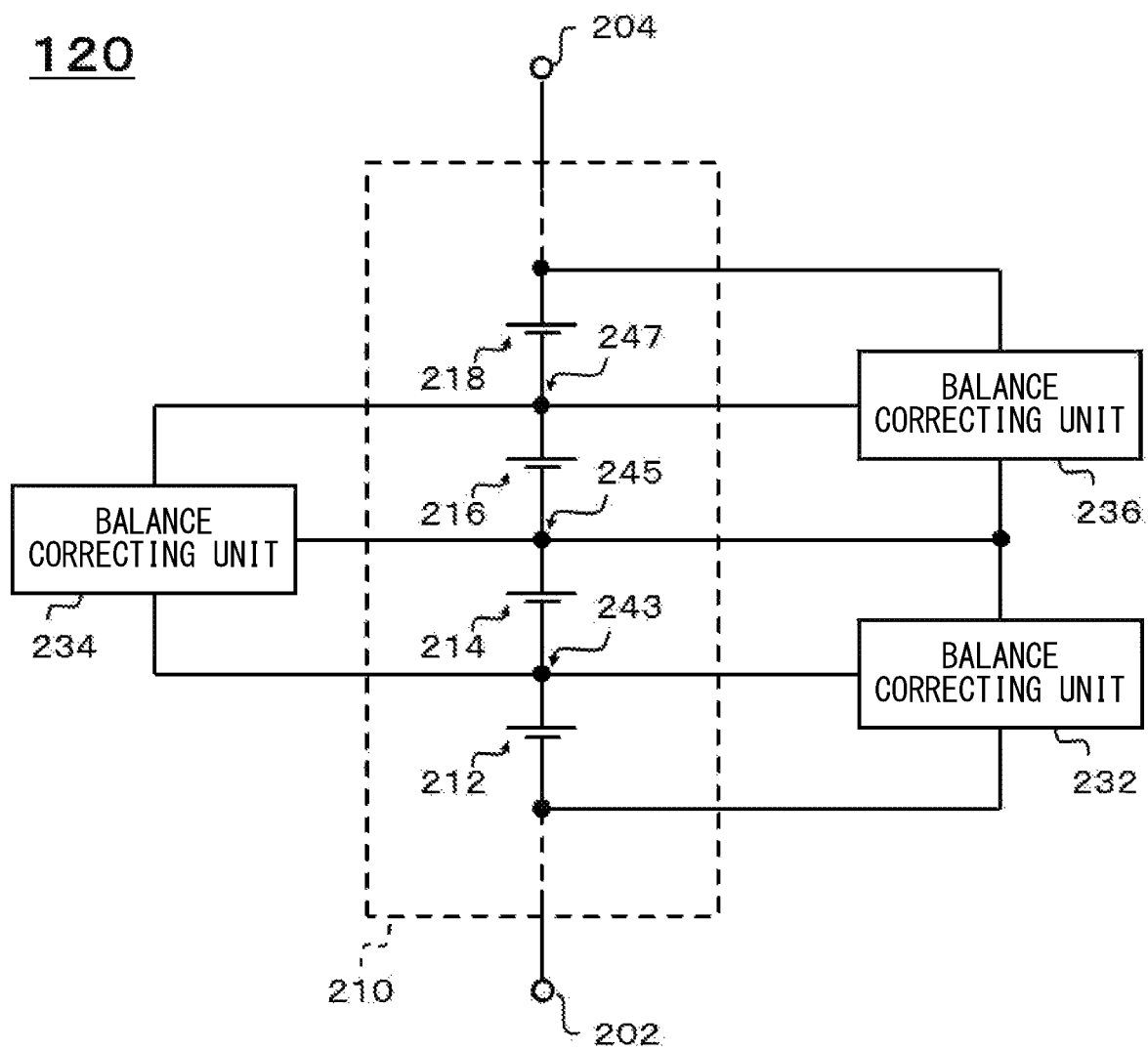
FIG. 2 schematically shows one example of the internal configuration of an electric storage module 120.

FIG. 2 schematically shows one example of the internal configuration of an electric storage module 120. In the present embodiment, the electric storage module 120 includes a terminal 202, a terminal 204 and an assembled battery 210. In the present embodiment, the assembled battery 210 is configured with a plurality of electric storage cells that are connected in series, including an electric storage cell 212, an electric storage cell 214, an electric storage cell 216 and an electric storage cell 218. In the present embodiment, the electric storage module 120 includes a plurality of balance correcting units including a balance correcting unit 232, a balance correcting unit 234 and a balance correcting unit 236. Each among the balance correcting unit 232, the balance correcting unit 234 and the balance correcting unit 236 may be one example of a balance correcting device and a balance correcting system.

In the present embodiment, the balance correcting unit 232 equalizes voltages of the electric storage cell 212 and the electric storage cell 214. In the present embodiment, the balance correcting unit 232 is electrically connected with one end of the electric storage cell 214 on the terminal 204 side (which is referred to as a positive electrode side in some cases). The balance correcting unit 232 is electrically connected with a connection point 243 between one end of the electric storage cell 214 on the terminal 202 side (which is referred to as a negative electrode side in some cases) and the positive electrode side of the electric storage cell 212. The balance correcting unit 232 is electrically connected with the negative electrode side of the electric storage cell 212.

In the present embodiment to be explained, the balance correcting unit 232 equalizes voltages of two adjacent electric storage cells. However, the balance correcting unit 232 is not limited to the present embodiment. In another embodiment, the balance correcting unit 232 may equalize voltages of two given electric storage cells among three or more electric storage cells that are connected in series.

In the present embodiment, the balance correcting unit 234 equalizes voltages of the electric storage cell 214 and the electric storage cell 216. The balance correcting unit 234 is electrically connected with the connection point 243, a connection point 245 between the positive electrode side of the electric storage cell 214 and the negative electrode side of the electric storage cell 216, and a connection point 247 between the positive electrode side of the electric storage cell 216 and the negative electrode side of the electric storage cell 218. The balance correcting unit 234 may have the same configuration as that of the balance correcting unit 232.

In the present embodiment, the balance correcting unit 236 equalizes voltages of the electric storage cell 216 and the electric storage cell 218. The balance correcting unit 236 is electrically connected with the connection point 245, the connection point 247, and the positive electrode side of the electric storage cell 218. The balance correcting unit 236 may have the same configuration as that of the balance correcting unit 232.

Figure 3:
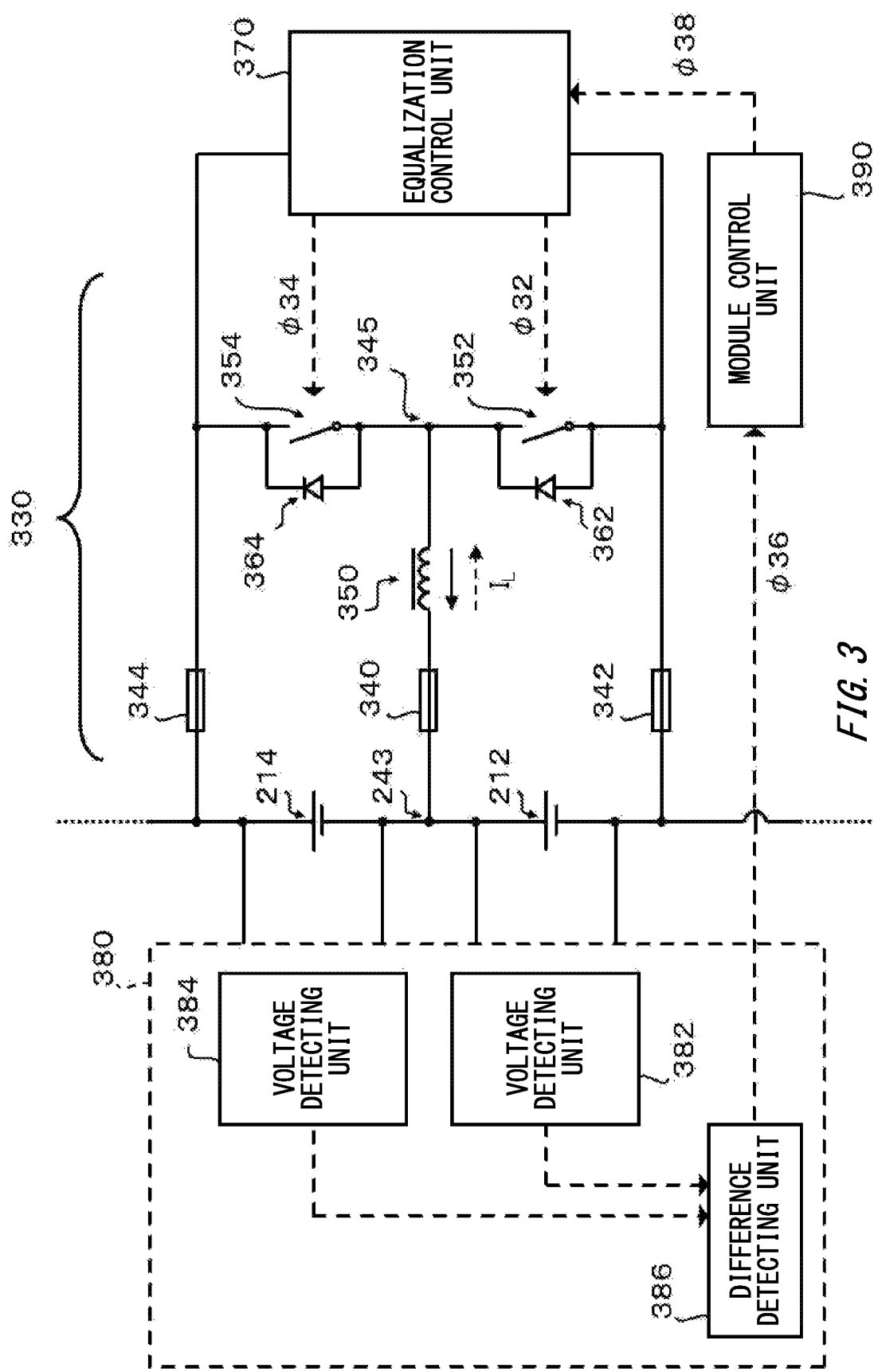
FIG. 3 schematically shows one example of the internal configuration of a balance correcting unit 232.

[Summary of Balance Correcting Unit 232] FIG. 3 schematically shows one example of the internal configuration of the balance correcting unit 232. FIG. 3 shows one example of the internal configuration of the balance correcting unit 232 together with the electric storage cell 212 and the electric storage cell 214. In the present embodiment, the balance correcting unit 232 includes an operation circuit 330 and an equalization control unit 370. In the present embodiment, the operation circuit 330 includes a fuse 340, a fuse 342, a fuse 344, an inductor 350, a switching element 352 and a switching element 354. The operation circuit 330 may include a diode 362 and a diode 364. The balance correcting unit 232 may include a voltage monitoring unit 380. The voltage monitoring unit 380 for example has a voltage detecting unit 382, a voltage detecting unit 384 and a difference detecting unit 386. The balance correcting unit 232 may include a module control unit 390.

The operation circuit 330 may be one example of a balance correcting device. The fuse 340, the fuse 342 and the fuse 344 may be one example of a current limiting element that limits current to flow through a transporting device if the magnitude of the current to flow through the transporting device exceeds a predetermined value. The inductor 350 may be one example of a transporting device. The equalization control unit 370 may be one example of a control device. The module control unit 390 may be one example of an abnormality detecting unit.

The equalization control unit 370, and the switching element 354 and the switching element 352 may be arranged on the physically same substrate, or may be arranged on physically different substrates. The equalization control unit 370 and the module control unit 390 may be formed on the physically same substrate, or may be formed on physically different substrates.

In the present embodiment to be explained, the balance correcting unit 232 includes the fuse 340, the fuse 342 and the fuse 344. However, the balance correcting unit 232 is not limited to the present embodiment. In another embodiment, the balance correcting unit 232 may not include some or all of the fuse 340, the fuse 342 and the fuse 344.

In the present embodiment to be explained, the balance correcting unit 232 has the equalization control unit 370 and the module control unit 390. However, the balance correcting unit 232 is not limited to the present embodiment. In another embodiment, the equalization control unit 370 may have at least some of functions of the module control unit 390, and the balance correcting unit 232 may not have the module control unit 390. In still another embodiment, the module control unit 390 has at least some of functions of the equalization control unit 370, and the balance correcting unit 232 may not have the equalization control unit 370.

In the present embodiment to be explained, the balance correcting unit 232 utilizes the inductor 350, the switching element 352 and the switching element 354 to equalize voltages of the electric storage cell 212 and the electric storage cell 214. However, the balance correcting unit 232 is not limited to the present embodiment. In another embodiment, the balance correcting unit 232 may equalize voltages of the electric storage cell 212 and the electric storage cell 214 by a known equalization scheme or an equalization scheme to be developed in the future. For example, as the balance correcting unit 232, a balance correcting circuit that utilizes a transformer or capacitor to transfer charges may be utilized.

[Summary of Each Unit of Balance Correcting Unit 232]
In the present embodiment, the balance correcting unit 232 is electrically connected with: (i) the positive electrode side of the electric storage cell 214; (ii) the connection point 243 between the negative electrode side of the electric storage cell 214 and the positive electrode side of the electric storage cell 212; and (iii) the negative electrode side of the electric storage cell 212. Thereby, a first keying circuit including the electric storage cell 214, the fuse 344, the switching element 354, the inductor 350 and the fuse 340 is formed. Also, a second keying circuit including the electric storage cell 212, the fuse 340, the inductor 350, the switching element 352 and the fuse 342 is formed. The connection point 243 may be one example of a connection point between one end of a first electric storage cell and one end of a second electric storage cell.

In the present embodiment, in the first keying circuit or second keying circuit, the fuse 340 is connected in series with the inductor 350. One end of the fuse 340 is electrically connected with one end of the inductor 350. The other end of the fuse 340 is electrically connected with the connection point 243. In the present embodiment, in the second keying circuit, the fuse 342 is connected in series with the inductor 350. One end of the fuse 342 is electrically connected with the other end of the inductor 350. The other end of the fuse 342 is electrically connected with the negative electrode side of the electric storage cell 212. In the present embodiment, in the first keying circuit, the fuse 344 is connected in series with the inductor 350. One end of the fuse 344 is electrically connected with the other end of the inductor 350. The other end of the fuse 344 is electrically connected with the positive electrode side of the electric storage cell 214.

In the present embodiment, each among the fuse 340, the fuse 342 and the fuse 344 limits current to flow through the inductor 350 if the magnitude of the absolute value of current to flow through the inductor 350 exceeds a predetermined value (which is referred to as a set value of a fuse in some cases). The set value of the fuse 340 may be higher than a set value(s) of at least either the fuse 342 or the fuse 344. Each among the fuse 340, the fuse 342 and the fuse 344 may be an overcurrent-blocking fuse or thermal fuse.

At least one of the switching element 352, the switching element 354 and the equalization control unit 370 experiences a malfunction, at least either the switching element 352 or the switching element 354 may remain closed. If the state where at least either the switching element 352 or the switching element 354 remains closed continues, an overcurrent might flow through at least either the electric storage cell 212 or the electric storage cell 214.

Regarding this, according to the present embodiment, at least either the fuse 340 or the fuse 344 is disposed in the first keying circuit. Also, at least either the fuse 340 or the fuse 342 is disposed in the second keying circuit. If a current flowing through the first keying circuit or second keying circuit exceeds a predetermined value, any of the fuse 340, the fuse 342 or the fuse 344 is disconnected. Thereby, flow of an overcurrent through at least either the electric storage cell 212 or the electric storage cell 214 is prevented.

More specifically, if for example the switching element 352 and the switching element 354 are caused to undergo a turn-off operation in order for the equalization control unit 370 to deactivate the balance correcting unit 232, at least one of the switching element 352, the switching element 354 and the equalization control unit 370 may experience a malfunction, and at least either the switching element 352 or the switching element 354 may become not able to undergo a turn-off operation. In such a case also, according to the present embodiment, the balance correcting unit 232 includes the fuse 340, the fuse 342 and the fuse 344 that are connected in series with the inductor 350. Thereby, flow of an overcurrent through at least either the electric storage cell 212 or the electric storage cell 214 can be prevented.

Also, the switching element 352, the switching element 354 or the equalization control unit 370 might experience a malfunction, and operation of either the switching element 352 or the switching element 354 might become unstable. In such a case also, according to the present embodiment, at least one of the fuse 340, the fuse 342 and the fuse 344 can be disconnected by causing any one manipulatable switching element among the switching element 352 and the switching element 354 to undergo a turn-on operation. Thereby, the balance correcting unit 232 can be forcibly deactivated. As a result, the electric storage cell 212 and the electric storage cell 214 can be protected from an overvoltage.

In the present embodiment, the inductor 350 transports energy between the electric storage cell 212 and the electric storage cell 214. In the present embodiment, the inductor 350 is disposed between the electric storage cell 214 and the switching element 354, and is connected in series with the electric storage cell 214 and the switching element 354. Thereby, the inductor 350 and the switching element 354 cooperate with each other to adjust a voltage(s) of at least either the electric storage cell 212 or the electric storage cell 214. In the present embodiment, one end of the inductor 350 is electrically connected with the connection point 243. The other end of the inductor 350 is electrically connected with a connection point 345 between the switching element 352 and the switching element 354.

According to the present embodiment, as a result of the switching element 352 and the switching element 354 alternately and repeatedly undergoing turn-on and turn-off operations (which are referred to as "turn-on/off operations" in some cases), an inductor current $I_L$ is generated to the inductor 350. Thereby, electrical energy can be transferred between the electric storage cell 212 and the electric storage cell 214 via the inductor 350. As a result, voltages of the electric storage cell 212 and the electric storage cell 214 can be equalized.

In the present embodiment, the switching element 352 switches the electrical connection relationship between the electric storage cell 212 and the inductor 350. In the present embodiment, the switching element 352 is electrically connected between the other end of the inductor 350 and the negative electrode side of the electric storage cell 212. The switching element 352 receives a drive signal ϕ32 from the equalization control unit 370, and undergoes a turn-on or turn-off operation based on the drive signal ϕ32. The second keying circuit is opened and closed in conjunction with operation of the switching element 352. The switching element 352 may be a semiconductor transistor such as a FET. The switching element 352 may be a MOSFET. If the switching element 352 is a FET, the gate of the FET may be one example of a receiving unit that receives the drive signal ϕ32.

In the present embodiment, the switching element 354 switches the electrical connection relationship between the electric storage cell 214 and the inductor 350. In the present embodiment, the switching element 354 is electrically connected between the other end of the inductor 350 and the positive electrode side of the electric storage cell 214. The switching element 354 receives a drive signal ϕ34 from the equalization control unit 370, and undergoes a turn-on or turn-off operation based on the drive signal ϕ34. The first keying circuit is opened and closed in conjunction with operation of the switching element 354. The switching element 354 may be a semiconductor transistor such as a FET. The switching element 354 may be a MOSFET. If the switching element 354 is a FET, the gate of the FET may be one example of a receiving unit that receives the drive signal ϕ34.

In the present embodiment, the diode 362 is electrically connected between the other end of the inductor 350 and the negative electrode side of the electric storage cell 212. The diode 362 is disposed in parallel with the switching element 352. If the switching element 352 is a semiconductor element such as a MOSFET, the diode 362 may be a parasitic diode formed equivalently between the source and drain of the switching element 352.

In the present embodiment, the diode 362 causes current to flow in a direction from the negative electrode side of the electric storage cell 212 to the other end of the inductor 350. On the other hand, the diode 362 does not cause current to flow in a direction from the other end of the inductor 350 to the negative electrode side of the electric storage cell 212. That is, current to flow in an orientation from the negative electrode side of the electric storage cell 212 to the positive electrode side of the electric storage cell 212 can pass through the diode 362, but current to flow in an orientation from the positive electrode side of the electric storage cell 212 to the negative electrode side of the electric storage cell 212 cannot pass through the diode 362.

In the present embodiment, the diode 364 is electrically connected between the other end of the inductor 350 and the positive electrode side of the electric storage cell 214. The diode 364 is disposed in parallel with the switching element 354. If the switching element 354 is a semiconductor element such as a MOSFET, the diode 364 may be a parasitic diode formed equivalently between the source and drain of the switching element 354.

In the present embodiment, the diode 364 causes current to flow in a direction from the other end of the inductor 350 to the positive electrode side of electric storage cell 214. On the other hand, the diode 364 does not cause current to flow in a direction from the positive electrode side of the electric storage cell 214 to the other end of the inductor 350. That is, current to flow in an orientation from the negative electrode side of the electric storage cell 214 to the positive electrode side of the electric storage cell 214 can pass through the diode 364, but current to flow in an orientation from the positive electrode side of the electric storage cell 214 to the negative electrode side of the electric storage cell 214 cannot pass through the diode 364.

Because the balance correcting unit 232 has the diode 362 and the diode 364, the inductor current $I_L$ can keep flowing in the first keying circuit or second keying circuit through the diode 362 or diode 364 even if the inductor current $I_L$ remains in the circuit in a period of time during which both the switching element 352 and the switching element 354 are turned off. Thereby, the balance correcting unit 232 can utilize the inductor current $I_L$ once generated in the inductor 350 without wasting the inductor current $I_L$. Also, the balance correcting unit 232 can suppress occurrence of surge voltage generated if the inductor current $I_L$ is blocked.

In the present embodiment, the equalization control unit 370 controls the operation circuit 330. In the present embodiment, the equalization control unit 370 controls at least either the switching element 352 or the switching element 354 to control the balance correcting unit 232. For example, the equalization control unit 370 controls at least either the switching element 352 or the switching element 354 based on an operation control signal ϕ38 from the module control unit 390.

In the present embodiment, the equalization control unit 370 supplies the switching element 352 with the drive signal ϕ32 for controlling turn-on/off operations of the switching element 352. Also, the equalization control unit 370 supplies the switching element 354 with the drive signal ϕ34 for controlling turn-on/off operations of the switching element 354.

In one embodiment, the equalization control unit 370 supplies the drive signal ϕ32 and the drive signal ϕ34 and activates the balance correcting unit 232 such that the switching element 352 and the switching element 354 alternately and repeatedly undergo turn-on/off operations (or complementarily). Thereby, while the balance correcting unit 232 is active, switching operations are repeated to switch between a state where current is flowing through the first keying circuit and a state where current is flowing through the second keying circuit switch alternately.

In another embodiment, the equalization control unit 370 supplies the drive signal ϕ32 and the drive signal ϕ34, and activates the balance correcting unit 232 such that one of the switching element 352 and the switching element 354 repeatedly undergo turn-on/off operations, and the other of the switching element 352 and the switching element 354 is kept turned off. Thereby, while the balance correcting unit 232 is active, switching operations are repeated to switch between a state where current is flowing through the first keying circuit and a state where current is flowing through the second keying circuit switch alternately.

For example, if the operation control signal ϕ38 indicates that charges are to be transferred from the electric storage cell 214 to the electric storage cell 212, the equalization control unit 370 supplies the drive signal ϕ32 and the drive signal ϕ34 such that the switching element 354 repeatedly undergoes turn-on/off operations, and switching element 352 is kept turned off. In this case, inductor current flows through the second keying circuit via the diode 362. On the other hand, if the operation control signal ϕ38 indicates that charges are to be transferred from the electric storage cell 212 to the electric storage cell 214, the equalization control unit 370 supplies the drive signal ϕ32 and the drive signal ϕ34 such that the switching element 352 repeatedly undergoes turn-on/off operations, and the switching element 354 is kept turned off. In this case, inductor current flows through the first keying circuit via the diode 364.

The equalization control unit 370 may combine the drive signal ϕ32 and the drive signal ϕ34 to generate various control signals to be used for controlling the balance correcting unit 232. In one embodiment, the equalization control unit 370 generates a first control signal for causing the switching element 354 to undergo a turn-on operation, and causing the switching element 352 to undergo a turn-off operation. In another embodiment, the equalization control unit 370 generates a second control signal for causing the switching element 354 to undergo a turn-off operation, and causing the switching element 352 to undergo a turn-on operation. In still another embodiment, the equalization control unit 370 generates a third control signal for causing the switching element 354 to undergo a turn-off operation, and causing the switching element 352 to undergo a turn-off operation. Each among the first control signal, the second control signal and the third control signal may be configured with the drive signal ϕ32 and the drive signal ϕ34.

The equalization control unit 370 for example controls the balance correcting unit 232 such that the balance correcting unit 232 repeatedly undergoes the following switching operation in an active state of the balance correcting unit 232. Also, the equalization control unit 370 for example controls the balance correcting unit 232 such that the balance correcting unit 232 deactivates the switching operation in an inactive state of the balance correcting unit 232.

For example, the equalization control unit 370 supplies the switching element 352 and the switching element 354 with the drive signal ϕ32 and the drive signal ϕ34 such that in an active period of the balance correcting unit 232, the balance correcting unit 232 repeats switching operations at a predetermined period. Here, the phrase "predetermined period" refers to situations including not only one in which the period of repetition of the switching operation is preset, but also one in which the period varies according to a given predetermined algorithm or one in which the period is varied by a given analog circuit disposed in advance.

For example, even if a period in a next cycle is determined according to some information about a current cycle and according to a predetermined particular algorithm or by a particular analog circuit, the period may be one example of the "predetermined period". Also, even if the timing to switch at least one of the first operation, the second operation and the third operation included in the switching operation to another operation is determined according to a particular algorithm or by a particular analog circuit, the period of the switching operation may be one example of the "predetermined period". The period is determined for example based on (i) a voltage(s) or SOC(s) of at least either the electric storage cell 212 or the electric storage cell 214, (ii) a current value of current to flow through the inductor 350, and (iii) a combination of these.

The switching operation may include (i) a first operation in which the switching element 354 undergoes a turn-on operation, and the switching element 352 undergoes a turn-off operation, and a (ii) a second operation in which the switching element 354 undergoes a turn-off operation, and the switching element 352 undergoes a turn-on operation. In addition to the first operation and the second operation, the switching operation may include a third operation in which both the switching element 354 and the switching element 352 undergo a turn-off operation. The order of the first operation, the second operation and the third operation may be determined arbitrarily, but preferably the second operation is performed following the first operation. The switching operation may include another operation different from the first operation, second operation and third operation.

In the present embodiment, the voltage monitoring unit 380 monitors a voltage(s) of at least either the electric storage cell 212 or the electric storage cell 214. In the present embodiment, the voltage monitoring unit 380 detects a voltage of the electric storage cell 212 and a voltage of the electric storage cell 214 by the voltage detecting unit 382 and the voltage detecting unit 384. The voltage monitoring unit 380 inputs the voltage of the electric storage cell 212 and the voltage of the electric storage cell 214 to the difference detecting unit 386, and detects the difference between voltages of the electric storage cell 212 and the electric storage cell 214. The voltage monitoring unit 380 generates a signal ϕ36 indicating the detected voltage difference, and transmits it to the module control unit 390. The signal ϕ36 may include information indicating which one, the voltage of the electric storage cell 212 or the voltage of the electric storage cell 214, is higher. The signal ϕ36 may include information indicating the voltage of the electric storage cell 212 and the voltage of the electric storage cell 214.

In the present embodiment, the module control unit 390 controls the balance correcting unit 232. The module control unit 390 may control a plurality of balance correcting units including the balance correcting unit 232. For example, the module control unit 390 controls the balance correcting unit 232 via the equalization control unit 370. More specifically, the module control unit 390 generates the operation control signal ϕ38 for controlling the equalization control unit 370, and transmits the operation control signal ϕ38 to the equalization control unit 370.

In one embodiment, the module control unit 390 determines a direction in which charges are to be transferred. For example, the module control unit 390 determines whether (i) to transfer charges from the electric storage cell 214 to the electric storage cell 212 or (ii) to transfer charges from the electric storage cell 212 to the electric storage cell 214, based on voltages or SOCs of the electric storage cell 212 and the electric storage cell 214. The module control unit 390 may transmit, to the equalization control unit 370, the operation control signal ϕ38 including information indicating a direction in which charges are to be transferred.

In another embodiment, the module control unit 390 estimates the net amount of charges (which is referred to as a charge transfer amount in some cases) that have been transferred between the electric storage cell 212 and the electric storage cell 214. For example, the module control unit 390 estimates the charge transfer amount based on (i) time during which the balance correcting unit 232 is active and (ii) a measured value or estimated value of current that has flown through the inductor 350. The module control unit 390 may control the balance correcting unit 232 based on an estimated value of the charge transfer amount. The module control unit 390 may transmit, to the equalization control unit 370, the operation control signal ϕ38 including information indicating an estimated value of the charge transfer amount.

The module control unit 390 may estimate time after the balance correcting unit 232 is activated and until it is deactivated. For example, the module control unit 390 estimates time after the balance correcting unit 232 is activated and until it is deactivated, based on the difference between voltages of the electric storage cell 214 and the electric storage cell 212 immediately before or after the balance correcting unit 232 is activated, and an estimated value of the charge transfer amount. The module control unit 390 may transmit, to the equalization control unit 370, the operation control signal ϕ38 including information indicating an estimated value of time after the balance correcting unit 232 is activated and until it is deactivated.

In another embodiment, the module control unit 390 determines at least either whether or not to activate the balance correcting unit 232 or whether or not to deactivate the balance correcting unit 232. The module control unit 390 may transmit, to the equalization control unit 370, the operation control signal ϕ38 including information indicating at least either whether or not to activate the balance correcting unit 232 or whether or not to deactivate the balance correcting unit 232.

In one embodiment, if a voltage(s) or SOC(s) of at least either the electric storage cell 212 or the electric storage cell 214 satisfies a predetermined condition, or if having received an instruction from a user or an instrument located outside the electric storage module 120, the module control unit 390 determines whether or not to activate the balance correcting unit 232 or whether or not to deactivate the balance correcting unit 232. In another embodiment, if an abnormality occurred to the balance correcting unit 232, the module control unit 390 determines to deactivate the balance correcting unit 232.

In the present embodiment, the module control unit 390 detects that an abnormality occurred to the balance correcting unit 232. The module control unit 390 may detect that an abnormality occurred to at least one of a plurality of balance correcting units included in the electric storage module 120. The module control unit 390 may detect that an abnormality occurred to the balance correcting unit 232 based on a value obtained through measurement by various types of sensors disposed in the balance correcting unit 232. The module control unit 390 may transmit, to the equalization control unit 370, the operation control signal ϕ38 including information indicating that an abnormality was detected.

In one embodiment, the module control unit 390 acquires, from a temperature sensor disposed inside or near the balance correcting unit 232, data obtained through measurement by the temperature sensor. If a value obtained through measurement by the temperature sensor is greater than a predetermined value, the module control unit 390 detects that abnormal heat generation is occurring in the balance correcting unit 232. If an abnormality such as a short circuit or a malfunction of a switching element occurred in the balance correcting unit 232, it is likely that the balance correcting unit 232 experiences heat generation. Because of this, the module control unit 390 can detect an abnormality such as a short circuit or a malfunction of a switching element that occurred to the balance correcting unit 232, by monitoring data obtained through measurement by the temperature sensor.

In another embodiment, the module control unit 390 acquires, from the voltage monitoring unit 380, information about a voltage(s) or SOC(s) of at least either the electric storage cell 212 or the electric storage cell 214. The module control unit 390 analyzes time-series data of a voltage(s) or SOC(s) of at least either the electric storage cell 212 or the electric storage cell 214, and judges whether or not the value of the voltage or SOC is undergoing a normal transition. If an abnormality such as a short circuit or a malfunction of a switching element occurred in the balance correcting unit 232, it is likely that time-series data of a voltage(s) or SOC(s) of at least either the electric storage cell 212 or the electric storage cell 214 indicates an abnormality. Because of this, the module control unit 390 can detect an abnormality such as a short circuit or a malfunction of a switching element that occurred to the balance correcting unit 232, by monitoring the voltage(s) or SOC(s) of at least either the electric storage cell 212 or the electric storage cell 214.

In another embodiment, the module control unit 390 acquires, from a current detecting unit for detecting inductor current flowing through the inductor 350, information about at least either the orientation or magnitude of the inductor current. The module control unit 390 analyzes at least either the orientation or magnitude of the inductor current, and judges whether or not an abnormality is occurring to the balance correcting unit 232. If an abnormality such as a short circuit or a malfunction of a switching element occurred in the balance correcting unit 232, it is likely that the absolute value of inductor current becomes greater than a predetermined value, time during which inductor current flows in one direction becomes longer than a predetermined value, and so on. Because of this, the module control unit 390 can detect an abnormality such as a short circuit or a malfunction of a switching element that occurred to the balance correcting unit 232, by monitoring at least either the orientation or magnitude of inductor current.

A current detecting unit utilized for detecting inductor current flowing through the inductor 350 can be (i) a resistor provided at an appropriate position in the first keying circuit including the electric storage cell 214, the inductor 350, and the switching element 354 or diode 364, (ii) a resistor provided at an appropriate position in the second keying circuit including the electric storage cell 212, the inductor 350, and the switching element 352 or diode 362, and the like. The resistors may be shunt resistors. At least either an internal resistance of the switching element 352 or an internal resistance of the switching element 354 may be utilized as a current detecting unit.

Figure 4:
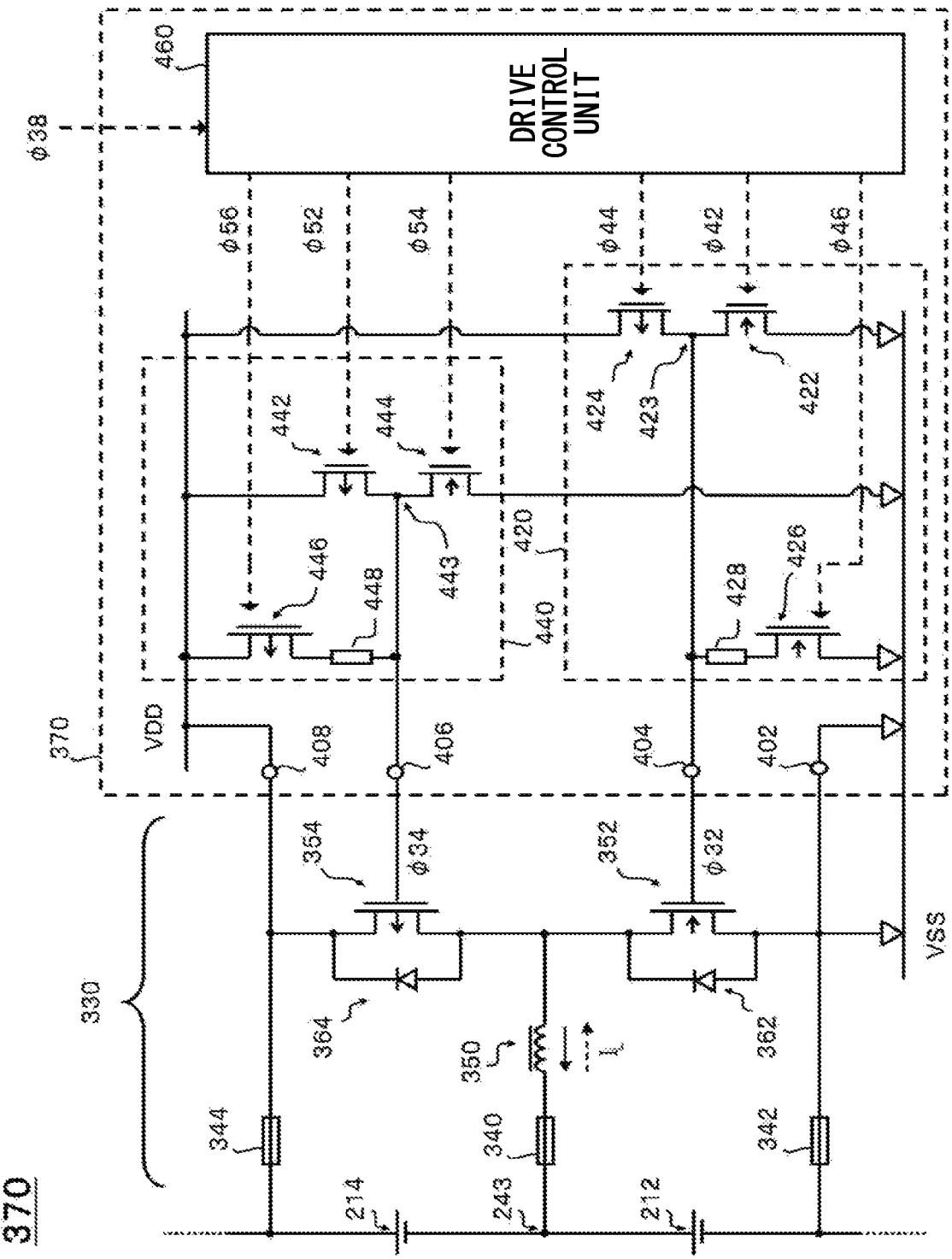
FIG. 4 schematically shows one example of the internal configuration of an equalization control unit 370.

FIG. 4 schematically shows one example of the internal configuration of the equalization control unit 370 together with the electric storage cell 212, the electric storage cell 214 and the operation circuit 330. In the present embodiment, the equalization control unit 370 includes a VSS terminal 402, a drive signal terminal 404, a drive signal terminal 406 and a VDD terminal 408. In the present embodiment, the equalization control unit 370 includes a drive signal supply unit 420, a drive signal supply unit 440 and a drive control unit 460. In the present embodiment, the drive signal supply unit 420 has a transistor 422, a transistor 424, a transistor 426 and a resistance 428. The drive signal supply unit 420 may not have one of the transistor 426 and the resistance 428. In the present embodiment, the drive signal supply unit 440 has a transistor 442, a transistor 444, a transistor 446 and a resistance 448. The drive signal supply unit 440 may not have one of the transistor 446 and the resistance 448.

The VSS terminal 402 may be one example of a power source unit. The VDD terminal 408 may be one example of a power source unit. The drive signal supply unit 420 may be one example of a control device. The drive signal supply unit 440 may be one example of a control device. The drive control unit 460 may be one example of a control signal generating unit. The transistor 422 may be one example of a first switching unit. The transistor 442 may be one example of a first switching unit. The transistor 426 may be one example of a second switching unit. The transistor 446 may be one example of a second switching unit. Other examples of a first switching unit and a second switching unit may include any element having a switching function.

In the present embodiment, the VSS terminal 402 is electrically connected with the negative electrode side of the electric storage cell 212. In the present embodiment, the VSS terminal 402 is electrically connected with the negative electrode side of the electric storage cell 212 via the fuse 342. In the present embodiment, the VSS terminal 402 receives, as a reference potential or reference voltage, an input of a potential or voltage of the negative electrode side of the electric storage cell 212. The VSS terminal 402 provides the drive signal supply unit 420 with a potential, voltage or current for generating the drive signal ϕ32. The VSS terminal 402 provides the drive signal supply unit 440 with a potential, voltage or current for generating the drive signal ϕ34.

In the present embodiment, the drive signal terminal 404 is electrically connected with the gate of the switching element 352. In the present embodiment, the drive signal terminal 404 outputs the drive signal ϕ32. The gate of the switching element 352 may be one example of a receiving unit that receives the drive signal ϕ32 generated by the drive signal supply unit 420.

In the present embodiment, the drive signal terminal 406 is electrically connected with the gate of the switching element 354. In the present embodiment, the drive signal terminal 406 outputs the drive signal ϕ34 generated by the drive signal supply unit 440. The gate of the switching element 354 may be one example of a receiving unit that receives the drive signal ϕ34.

In the present embodiment, the VDD terminal 408 is electrically connected with the positive electrode side of the electric storage cell 214. In the present embodiment, the VDD terminal 408 is electrically connected with the positive electrode side of the electric storage cell 214 via the fuse 344. In the present embodiment, the VDD terminal 408 receives, as a power source potential or power source voltage, an input of a potential or voltage of the positive electrode side of the electric storage cell 214. The VDD terminal 408 provides the drive signal supply unit 420 with a potential, voltage or current for generating the drive signal ϕ32. The VDD terminal 408 provides the drive signal supply unit 440 with a potential, voltage or current for generating the drive signal ϕ34.

In the present embodiment, the drive signal supply unit 420 generates the drive signal ϕ32 and supplies the drive signal ϕ32 to the switching element 352. In the present embodiment, the drive signal supply unit 420 operates based on a control signal ϕ42, control signal ϕ44 and control signal ϕ46 that are supplied from the drive control unit 460. At least either the control signal ϕ42 or the control signal ϕ44 may be one example of a first control signal. The control signal ϕ46 may be one example of a second control signal.

In the present embodiment, the drive signal supply unit 420 has an activation signal supply path including (i) a wire electrically connected with the VSS terminal 402 or the reference potential VSS, (ii) the transistor 422, (iii) a connection point 423 between the transistor 422 and the transistor 424, and (iv) a wire electrically connected with the drive signal terminal 404. According to the present embodiment, operation of the transistor 422 results in electrical connection between the VSS terminal 402 or reference potential VSS and the gate of the switching element 352. Thereby, the drive signal ϕ32 is supplied to the switching element 352 via the activation signal supply path. Also, operation of the transistor 422 results in disconnection of electrical connection between the VSS terminal 402 or reference potential VSS and the gate of the switching element 352. Thereby, supply of the drive signal ϕ32 via the activation signal supply path is deactivated. The activation signal supply path may be one example of a first path.

In the present embodiment, the drive signal supply unit 420 has a protection signal supply path including (i) a wire electrically connected with the VSS terminal 402 or the reference potential VSS, (ii) the transistor 426, (iii) the resistance 428, and (iv) a wire electrically connected with the drive signal terminal 404. According to the present embodiment, operation of the transistor 426 results in electrical connection between the VSS terminal 402 or reference potential VSS and the gate of the switching element 352. Thereby, the drive signal ϕ32 is supplied to the switching element 352 via the protection signal supply path. Also, operation of the transistor 426 results in disconnection of electrical connection between the VSS terminal 402 or reference potential VSS and the gate of the switching element 352. Thereby, supply of the drive signal ϕ32 via the protection signal supply path is deactivated. The protection signal supply path may be one example of a second path.

In the present embodiment, a "value of a combined resistance of a wire of the protection signal supply path and one or more elements disposed in the protection signal supply path" is set to be greater than a "value of a combined resistance of a wire of the activation signal supply path and one or more elements disposed in the activation signal supply path". A "value of a combined resistance of the one or more elements disposed in the protection signal supply path" may be set to be greater than a "value of a combined resistance of the one or more elements disposed in the activation signal supply path". The elements may be switching elements. The switching elements may be transistors.

In the present embodiment, the transistor 422 is disposed in the activation signal supply path. In the present embodiment, in the activation signal supply path, the transistor 422 switches the electrical connection relationship between the VSS terminal 402 or reference potential VSS and the drive signal terminal 404 or gate of the switching element 352. For example, if the transistor 422 undergoes a turn-on operation, the VSS terminal 402 or reference potential VSS and the drive signal terminal 404 or gate of the switching element 352 are electrically connected. If the transistor 422 undergoes a turn-off operation, electrical connection established by the transistor 422 between the VSS terminal 402 or reference potential VSS and the drive signal terminal 404 or gate of the switching element 352 is disconnected.

The transistor 422 may be a semiconductor transistor such as a FET. The transistor 422 may be a MOSFET. The transistor 422 may be chosen such that a "value of a combined resistance of a wire of the protection signal supply path and one or more elements disposed in the protection signal supply path" becomes greater than a "value of a combined resistance of a wire of the activation signal supply path and one or more elements disposed in the activation signal supply path".

The transistor 422 used is a transistor having a relatively low ON-resistance, in order for the switching element 352 to be switched at high speed. The ON-resistance of the transistor 422 may be lower than 1Ω, 800 mΩ or lower, 500 mΩ or lower, 300 mΩ or lower, 200 mΩ or lower or 100 mΩ or lower. The ON-resistance of the transistor 422 may be 80 mΩ or lower, 50 mΩ or lower, 30 mΩ or lower, 20 mΩ or lower or 10 mΩ or lower.

In the present embodiment, one end of the transistor 424 is electrically connected with the transistor 422, and the other end of the transistor 424 is electrically connected with the VDD terminal 408 or power source voltage VDD. By the transistor 424 and the transistor 422 operating complementarily, the drive signal ϕ32 is generated. Characteristics of the transistor 424 are preferably the identical or analogous to characteristics of the transistor 422. The characteristics may be at least one of type, model number, ON-resistance, response speed and parasitic capacitance.

In the present embodiment, the transistor 426 is disposed in the protection signal supply path. Also, in the present embodiment, the resistance 428 is disposed between the transistor 426 and the drive signal terminal 404. The arrangement of the resistance 428 is not particularly limited. In another embodiment, the resistance 428 may be disposed between the transistor 426 and the VSS terminal 402 or reference potential VSS. Also, the protection signal supply path may not have the resistance 428 arranged therein. In the present embodiment, the transistor 426 and the resistance 428 are chosen for example such that the switching element 352 can be constantly turned off in a state where the transistor 426 is turned on.

In the present embodiment, the transistor 426 switches the electrical connection relationship between the VSS terminal 402 or reference potential VSS and the drive signal terminal 404 or gate of the switching element 352. For example, if the transistor 426 undergoes a turn-on operation, the VSS terminal 402 or reference potential VSS and the drive signal terminal 404 or gate of the switching element 352 are electrically connected. If the transistor 426 undergoes a turn-off operation, electrical connection established by the transistor 422 between the VSS terminal 402 or reference potential VSS and the drive signal terminal 404 or gate of the switching element 352 is disconnected.

The transistor 426 may be a semiconductor transistor such as a FET. The transistor 426 may be a MOSFET. The transistor 426 may be chosen such that a "value of a combined resistance of a wire of the protection signal supply path and one or more elements disposed in the protection signal supply path" becomes greater than a "value of a combined resistance of a wire of the activation signal supply path and one or more elements disposed in the activation signal supply path".

The transistor 426 used is a transistor having a relatively high ON-resistance such that for example the transistor 426 is not damaged even if the drive signal terminal 404 and for example the VDD terminal 408 or power source voltage VDD are short-circuited, and a large current flows through the transistor 426. The ON-resistance of the transistor 426 may be 1Ω or higher, higher than 1Ω, 5Ω or higher, 10Ω or higher, 20Ω or higher, 30Ω or higher, 50Ω or higher, 80Ω or higher or 100Ω or higher. The ON-resistance of the transistor 426 may be 1 kΩ or higher, 2 kΩ or higher, 3 kΩ or higher or 5 kΩ or higher.

In one embodiment, the transistor 426 has characteristics different from those of the transistor 422. For example, the ON-resistance of the transistor 426 is greater than the ON-resistance of the transistor 422. The ON-resistance value of the transistor 426 may be set such that the total of it and the resistance value of the resistance 428 becomes greater than the ON-resistance value of the transistor 422.

In another embodiment, characteristics of the transistor 426 may be identical or analogous to characteristics of the transistor 422. In this case also, because the protection signal supply path has the resistance 428 disposed therein, a "value of a combined resistance of a wire of the protection signal supply path and one or more elements disposed in the protection signal supply path" may be set to be greater than a "value of a combined resistance of a wire of the activation signal supply path and one or more elements disposed in the activation signal supply path".

In the present embodiment, the drive signal supply unit 440 generates the drive signal ϕ34 and supplies the drive signal ϕ34 to the switching element 354. In the present embodiment, the drive signal supply unit 440 operates based on a control signal ϕ52, control signal ϕ54 and control signal ϕ56 that are supplied from the drive control unit 460. At least either the control signal ϕ52 or the control signal ϕ54 may be one example of a first control signal. The control signal ϕ56 may be one example of a second control signal.

In the present embodiment, the drive signal supply unit 440 has an activation signal supply path including (i) a wire electrically connected with the VDD terminal 408 or the power source voltage VDD, (ii) the transistor 442, (iii) a connection point 443 between the transistor 442 and the transistor 444, and (iv) a wire electrically connected with the drive signal terminal 406. According to the present embodiment, operation of the transistor 442 results in electrical connection between the VDD terminal 408 or power source voltage VDD and the gate of the switching element 354. Thereby, the drive signal ϕ34 is supplied to the switching element 354 via the activation signal supply path. Also, operation of the transistor 442 results in disconnection of electrical connection between the VDD terminal 408 or power source voltage VDD and the gate of the switching element 354. Thereby, supply of the drive signal ϕ34 via the activation signal supply path is deactivated. The activation signal supply path may be one example of a first path.

In the present embodiment, the drive signal supply unit 440 has a protection signal supply path including (i) a wire electrically connected with the VDD terminal 408 or the power source voltage VDD, (ii) the transistor 446, (iii) the resistance 448, and (iv) a wire electrically connected with the drive signal terminal 406. According to the present embodiment, operation of the transistor 446 results in electrical connection between the VDD terminal 408 or power source voltage VDD and the gate of the switching element 354. Thereby, the drive signal ϕ34 is supplied to the switching element 354 via the protection signal supply path. Also, operation of the transistor 446 results in disconnection of electrical connection between the VDD terminal 408 or power source voltage VDD and the gate of the switching element 354. Thereby, supply of the drive signal ϕ34 via the activation signal supply path is deactivated. The protection signal supply path may be one example of a second path.

In the present embodiment, a "value of a combined resistance of a wire of the protection signal supply path and one or more elements disposed in the protection signal supply path" is set to be greater than a "value of a combined resistance of a wire of the activation signal supply path and one or more elements disposed in the activation signal supply path". A "value of a combined resistance of the one or more elements disposed in the protection signal supply path" may be set to be greater than a "value of a combined resistance of the one or more elements disposed in the activation signal supply path". The elements may be switching elements. The switching elements may be transistors.

In the present embodiment, the transistor 442 is disposed in the activation signal supply path. In the present embodiment, in the activation signal supply path, the transistor 442 switches the electrical connection relationship between the VDD terminal 408 or power source voltage VDD and the drive signal terminal 406 or gate of the switching element 354. For example, if the transistor 442 undergoes a turn-on operation, the VDD terminal 408 or power source voltage VDD and the drive signal terminal 406 or gate of the switching element 354 are electrically connected. If the transistor 442 undergoes a turn-off operation, electrical connection established by the transistor 442 between the VDD terminal 408 or power source voltage VDD and the drive signal terminal 406 or gate of the switching element 354 is disconnected.

The transistor 442 may be a semiconductor transistor such as a FET. The transistor 442 may be a MOSFET. The transistor 442 may be chosen such that a "value of a combined resistance of a wire of the protection signal supply path and one or more elements disposed in the protection signal supply path" becomes greater than a "value of a combined resistance of a wire of the activation signal supply path and one or more elements disposed in the activation signal supply path".

The transistor 442 used is a transistor having a relatively low ON-resistance, in order for the switching element 354 to be switched at high speed. The ON-resistance of the transistor 442 may be lower than 1Ω, 800 mΩ or lower, 500 mΩ or lower, 300 mΩ or lower, 200 mΩ or lower or 100 mΩ or lower. The ON-resistance of the transistor 442 may be 80 mΩ or lower, 50 mΩ or lower, 30 mΩ or lower, 20 mΩ or lower or 10 mΩ or lower.

In the present embodiment, one end of the transistor 444 is electrically connected with the transistor 442, and the other end of the transistor 444 is electrically connected with the VSS terminal 402 or reference potential VSS. By the transistor 444 and the transistor 442 operating complementarily, the drive signal φ34 is generated. Characteristics of the transistor 444 are preferably identical or analogous to characteristics of the transistor 442. The characteristics may be at least one of type, model number, ON-resistance, response speed and parasitic capacitance.

In the present embodiment, the transistor 446 is disposed in the protection signal supply path. Also, in the present embodiment, the resistance 448 is disposed between the transistor 446 and the drive signal terminal 406. The arrangement of the resistance 448 is not particularly limited. In another embodiment, the resistance 448 may be disposed between the transistor 446 and the VDD terminal 408 or power source voltage VDD. Also, the protection signal supply path may not have the resistance 448 arranged therein. In the present embodiment, the transistor 446 and the resistance 448 are chosen for example such that the switching element 354 can be constantly turned off in a state where the transistor 446 is turned on.

In the present embodiment, the transistor 446 switches the electrical connection relationship between the VDD terminal 408 or power source voltage VDD and the drive signal terminal 406 or gate of the switching element 354. For example, if the transistor 446 undergoes a turn-on operation, the VDD terminal 408 or power source voltage VDD and the drive signal terminal 406 or gate of the switching element 354 are electrically connected. If the transistor 446 undergoes a turn-off operation, electrical connection established by the transistor 446 between the VDD terminal 408 or power source voltage VDD and the drive signal terminal 406 or gate of the switching element 354 is disconnected.

The transistor 446 may be a semiconductor transistor such as a FET. The transistor 446 may be a MOSFET. The transistor 446 may be chosen such that a "value of a combined resistance of a wire of the protection signal supply path and one or more elements disposed in the protection signal supply path" becomes greater than a "value of a combined resistance of a wire of the activation signal supply path and one or more elements disposed in the activation signal supply path".

The transistor 446 used is a transistor having a relatively high ON-resistance such that for example the transistor 446 is not damaged even if the drive signal terminal 406 and the VSS terminal 402 or reference potential VSS are short-circuited, and a large current flows through the transistor 446. The ON-resistance of the transistor 446 may be 1Ω or higher, higher than 1Ω, 5Ω or higher, 10Ω or higher, 20Ω or higher, 30Ω or higher, 50Ω or higher, 80Ω or higher or 100Ω or higher. The ON-resistance of the transistor 446 may be 1 kΩ or higher, 2 kΩ or higher, 3 kΩ or higher or 5 kΩ or higher.

In one embodiment, the transistor 446 has characteristics different from those of the transistor 442. For example, the ON-resistance of the transistor 446 is greater than the ON-resistance of the transistor 442. The ON-resistance value of the transistor 446 may be set such that the total of it and the resistance value of the resistance 448 becomes greater than the ON-resistance value of the transistor 442.

In another embodiment, characteristics of the transistor 446 may be identical or analogous to characteristics of the transistor 442. In this case also, because the protection signal supply path has the resistance 448 disposed therein, a "value of a combined resistance of a wire of the protection signal supply path and one or more elements disposed in the protection signal supply path" may be set to be greater than a "value of a combined resistance of a wire of the activation signal supply path and one or more elements disposed in the activation signal supply path".

In the present embodiment, the drive control unit 460 controls operation of the drive signal supply unit 420 to supply the drive signal φ32 to the switching element 352. The drive control unit 460 may generate the control signal φ42 for controlling operation of the transistor 422. The drive control unit 460 may generate the control signal φ44 for controlling operation of the transistor 424. The drive control unit 460 may generate the control signal φ46 for controlling operation of the transistor 426.

In the present embodiment, the drive control unit 460 controls operation of the drive signal supply unit 440 to supply the drive signal φ34 to the switching element 354. The drive control unit 460 may generate the control signal φ52 for controlling operation of the transistor 442. The drive control unit 460 may generate the control signal φ54 for controlling operation of the transistor 444. The drive control unit 460 may generate the control signal φ56 for controlling operation of the transistor 446.

[First Operation Example of Drive control unit 460] In one embodiment, if the balance correcting unit 232 executes an equalization operation, the drive control unit 460 generates the control signal φ42 such that operation of the transistor 422 results in generation of the drive signal φ32. The drive signal φ32 may be a signal for switching the ON-state and OFF-state of the switching element 352. More specifically, in the present embodiment, the drive control unit 460 generates the control signal φ42 and the control signal φ44 such that operation of the transistor 422 and transistor 424 results in generation of the drive signal φ32 for causing the switching element 352 to alternately and repeatedly undergo turn-on and turn-off operations.

As described above, the drive control unit 460 may generate the control signal φ42 and the control signal φ44 such that the switching element 352 and the switching element 354 alternately and repeatedly undergo turn-on operations. The drive control unit 460 may generate the control signal φ42 and the control signal φ44 such that one of the switching element 352 and the switching element 354 repeatedly undergoes turn-on/off operations, and the other of the switching element 352 and the switching element 354 is kept turned off.

In the present embodiment, if the balance correcting unit 232 executes an equalization operation, when an abnormality of the balance correcting unit 232 is not detected, the drive control unit 460 generates the control signal φ42 and the control signal φ44 in the manner. In this case, the drive control unit 460 may generate the control signal φ46 such that the transistor 426 is kept turned off. Thereby, if an equalization operation by the balance correcting unit 232 is being executed normally, the drive signal supply unit 420 supplies the drive signal φ32 to the switching element 352 via the activation signal supply path.

Likewise, if the balance correcting unit 232 executes an equalization operation, the drive control unit 460 generates the control signal φ52 such that operation of the transistor 442 results in generation of the drive signal φ34. The control signal φ52 may be a signal for switching the ON-state and OFF-state of the switching element 354. More specifically, in the present embodiment, the drive control unit 460 generates the control signal φ52 and the control signal φ54 such that operation of the transistor 442 and the transistor 444 results in generation of the drive signal φ34 for causing the switching element 354 to alternately and repeatedly undergo turn-on and turn-off operations.

As described above, the drive control unit 460 may generate the control signal φ52 and the control signal φ54 such that the switching element 352 and the switching element 354 alternately and repeatedly undergo turn-on operations. The drive control unit 460 may generate the control signal φ52 and the control signal φ54 such that one of the switching element 352 and the switching element 354 repeatedly undergoes turn-on/off operations, and the other of the switching element 352 and the switching element 354 is kept turned off.

In the present embodiment, if the balance correcting unit 232 executes an equalization operation, the drive control unit 460 generates the control signal φ52 and the control signal φ54 in the manner when an abnormality of the balance correcting unit 232 is not detected. In this case, the drive control unit 460 may generate the control signal φ56 such that the transistor 446 is kept turned off. Thereby, if an equalization operation by the balance correcting unit 232 is being executed normally, the drive signal supply unit 440 supplies the drive signal φ34 to the switching element 354 via the activation signal supply path.

[Second Operation Example of Drive control unit 460] In another embodiment, if the balance correcting unit 232 deactivates its equalization operation, the drive control unit 460 first supplies the drive signal φ32 for making the switching element 352 turned off to the switching element 352 via both the activation signal supply path and the protection signal supply path. The drive control unit 460 may control the transistor 422 and the transistor 426 such that (i) operation of the transistor 422 results in supply of the drive signal φ32 for making the switching element 352 turned off to the switching element 352 via the activation signal supply path, and then (ii) operation of the transistor 426 results in supply of the drive signal φ32 for making the switching element 352 turned off to the switching element 352 via the protection signal supply path.

Specifically, the drive control unit 460 generates the control signal φ42 and the control signal φ44 such that operation of the transistor 422 results in generation of the drive signal φ32 for making the switching element 352 turned off. For example, the drive control unit 460 generates the control signal φ42 for causing the transistor 422 to undergo a turn-on operation, and generates the control signal φ44 for causing the transistor 424 to undergo a turn-off operation. Also, the drive control unit 460 generates the control signal φ46 such that operation of the transistor 426 results in generation of the drive signal φ32 for causing the switching element 352 to undergo a turn-off operation. For example, the drive control unit 460 generates the control signal φ46 for causing the transistor 426 to undergo a turn-on operation.

After the drive signal φ32 for making the switching element 352 turned off is supplied to the switching element 352, the state of the balance correcting unit 232 becomes unstable for a while due to ringing or the like in some cases. In view of this, the period of time after the drive signal φ32 for making the switching element 352 turned off is supplied to the switching element 352 via the activation signal supply path and until the drive signal φ32 is supplied to the switching element 352 via the protection signal supply path is preferably set based on the period of time until the state of the balance correcting unit 232 is stabilized. The period of time until the state of the balance correcting unit 232 is stabilized can be determined based on a result of a test performed in advance, a simulation result, an actual value or the like. Thereby, it is possible to suppress malfunctions of at least either the switching element 352 or the switching element 354 due to influence of ringing generated by deactivation of at least either the switching element 352 or the switching element 354.

Next, the drive control unit 460 deactivates supply of the drive signal φ32 via the activation signal supply path. Specifically, the drive control unit 460 generates the control signal φ42 for causing the transistor 422 to undergo a turn-off operation. At this time, the drive control unit 460 keeps the transistor 426 turned on. Thereby, in a state where the drive signal φ32 for making the switching element 352 turned off is supplied to the switching element 352 via the protection signal supply path, electrical connection established by the transistor 422 between the VSS terminal 402 or reference potential VSS and the drive signal terminal 404 or gate of the switching element 352 is disconnected.

According to another example, the drive control unit 460 may generate at least one of the control signal φ42, the control signal φ44 and the control signal φ46 such that (i) operation of the transistor 426 results in supply of the drive signal φ32 for making the switching element 352 turned off to the switching element 352 via the protection signal supply path, and then (ii) the transistor 422 undergoes a turn-off operation. During this period of time, the drive control unit 460 may supply the control signal φ44 to keep the transistor 424 turned off to the transistor 424. Also, the period of time after the drive signal φ32 for making the switching element 352 turned off is supplied to the switching element 352 via the protection signal supply path and until the control signal φ42 for causing the transistor 422 to undergo a turn-off operation is supplied to the transistor 422 may be set based on the period of time until the state of the balance correcting unit 232 is stabilized.

For example, if the drive signal terminal 404 and for example the VDD terminal 408 or power source voltage VDD are short-circuited for some cause in a state where the balance correcting unit 232 has deactivated its equalization operation, the switching element 352 undergoes a turn-on operation, and current flows through the second keying circuit. According to the present embodiment, even if a relatively large current flows through the second keying circuit, damages to the electric storage cell 212 and the electric storage cell 214 can be prevented due to the fuse 340 or the fuse 342 being disconnected. However, according to the present embodiment, the negative electrode side of the electric storage cell 212 and the VSS terminal 402 are electrically connected, and the positive electrode side of the electric storage cell 214 and the VDD terminal 408 are electrically connected. Because of this, a relatively large current might flow through the transistor 422.

According to the present embodiment, because the transistor 422 becomes turned off when the balance correcting unit 232 deactivates its equalization operation, damages to the transistor 422 can be prevented. Also, if a "value of a combined resistance of a wire of the protection signal supply path and one or more elements disposed in the protection signal supply path" is greater than a "value of a combined resistance of a wire of the activation signal supply path and one or more elements disposed in the activation signal supply path", even damages to the transistor 426 disposed in the protection signal supply path can be prevented.

Likewise, if the balance correcting unit 232 deactivates its equalization operation, the drive control unit 460 first supplies the drive signal ϕ34 for making the switching element 354 turned off to the switching element 354 via both the activation signal supply path and the protection signal supply path. The drive control unit 460 may control the transistor 442 and the transistor 446 such that (i) operation of the transistor 442 results in supply of the drive signal ϕ32 for making the switching element 354 turned off to the switching element 354 via the activation signal supply path, and then (ii) operation of the transistor 446 results in supply of the drive signal ϕ34 for making the switching element 354 turned off to the switching element 354 via the protection signal supply path.

Specifically, the drive control unit 460 generates the control signal ϕ52 and the control signal ϕ54 such that operation of the transistor 442 results in generation of the drive signal ϕ34 for making the switching element 354 turned off. For example, the drive control unit 460 generates the control signal ϕ52 for causing the transistor 442 to undergo a turn-on operation, and generates the control signal ϕ54 for causing the transistor 444 to undergo a turn-off operation. Also, the drive control unit 460 generates the control signal ϕ56 such that operation of the transistor 446 results in generation of the drive signal ϕ34 for causing the switching element 354 to undergo a turn-off operation. For example, the drive control unit 460 generates the control signal ϕ56 for causing the transistor 446 to undergo a turn-on operation.

After the drive signal ϕ34 for making the switching element 354 turned off is supplied to the switching element 354, the state of the balance correcting unit 232 becomes unstable for a while due to ringing or the like in some cases. In view of this, the period of time after the drive signal ϕ34 for making the switching element 354 turned off is supplied to the switching element 354 via the activation signal supply path and until the drive signal ϕ34 is supplied to the switching element 354 via the protection signal supply path is preferably set based on the period of time until the state of the balance correcting unit 232 is stabilized. The period of time until the state of the balance correcting unit 232 is stabilized can be determined based on a result of a test performed in advance, a simulation result, an actual value or the like. Thereby, it is possible to suppress malfunctions of at least either the switching element 352 or the switching element 354 due to influence of ringing generated by deactivation of at least either the switching element 352 or the switching element 354.

Next, the drive control unit 460 deactivates supply of the drive signal ϕ34 via the activation signal supply path. Specifically, the drive control unit 460 generates the control signal ϕ52 for causing the transistor 442 to undergo a turn-off operation. At this time, the drive control unit 460 keeps the transistor 446 turned on. Thereby, in a state where the drive signal ϕ34 for making the switching element 354 turned off is supplied to the switching element 354 via the protection signal supply path, electrical connection established by the transistor 442 between the VDD terminal 408 or power source voltage VDD and the drive signal terminal 406 or gate of the switching element 354 is disconnected.

According to another example, the drive control unit 460 may generate at least one of the control signal ϕ52, the control signal ϕ54 and the control signal ϕ56 such that (i) operation of the transistor 446 results in supply of the drive signal ϕ34 for making the switching element 354 turned off to the switching element 354 via the protection signal supply path, and then (ii) the transistor 442 undergoes a turn-off operation. During this period of time, the drive control unit 460 may supply the control signal ϕ54 to keep the transistor 444 turned off to the transistor 444. Also, the period of time after the drive signal ϕ34 for making the switching element 354 turned off is supplied to the switching element 354 via the protection signal supply path and until the control signal ϕ52 for causing the transistor 442 to undergo a turn-off operation is supplied to the transistor 442 may be set based on the period of time until the state of the balance correcting unit 232 is stabilized.

For example, if the drive signal terminal 406 and the VSS terminal 402 or reference potential VSS are short-circuited for some cause in a state where the balance correcting unit 232 has deactivated its equalization operation, the switching element 354 undergoes a turn-on operation, and current flows through the first keying circuit. According to the present embodiment, even if a relatively large current flows through the first keying circuit, damages to the electric storage cell 212 and the electric storage cell 214 can be prevented due to the fuse 340 or the fuse 344 being disconnected. However, according to the present embodiment, the negative electrode side of the electric storage cell 212 and the VSS terminal 402 are electrically connected, and the positive electrode side of the electric storage cell 214 and the VDD terminal 408 are electrically connected. Because of this, a relatively large current might flow through the transistor 442.

According to the present embodiment, because the transistor 442 becomes turned off when the balance correcting unit 232 deactivates its equalization operation, damages to the transistor 442 can be prevented. Also, if a "value of a combined resistance of a wire of the protection signal supply path and one or more elements disposed in the protection signal supply path" is greater than a "value of a combined resistance of a wire of the activation signal supply path and one or more elements disposed in the activation signal supply path", even damages to the transistor 446 disposed in the protection signal supply path can be prevented.

[Third Operation Example of Drive control unit 460] In another embodiment, the drive control unit 460 receives, from the module control unit 390, the operation control signal ϕ38 including information indicating that some abnormality related to the balance correcting unit 232 is detected. In the present embodiment, if having received the operation control signal ϕ38, the drive control unit 460 supplies the drive signal ϕ32 for making the switching element 352 turned off to the switching element 352 via the protection signal supply path. Also, the drive control unit 460 deactivates supply of the drive signal ϕ32 via the activation signal supply path. The drive control unit 460 may (i) supply the drive signal ϕ32 for making the switching element 352 turned off to the switching element 352 via the protection signal supply path and then (ii) deactivate supply of the drive signal ϕ32 via the activation signal supply path.

Specifically, the drive control unit 460 generates the control signal ϕ42 for causing the transistor 422 to undergo a turn-off operation. The drive control unit 460 may generate the control signal ϕ44 for causing the transistor 424 to undergo a turn-off operation. Also, the drive control unit 460 generates the control signal ϕ46 such that operation of the transistor 426 results in generation of the drive signal ϕ32 for causing the switching element 352 to undergo a turn-off operation. Thereby, an effect similar to that in the second operation example is obtained. In addition, while some abnormality is occurring to the balance correcting unit 232, the transistor 422 can be protected promptly.

Likewise, if having received the operation control signal ϕ38, the drive control unit 460 supplies the drive signal ϕ34 for making the switching element 354 turned off to the switching element 354 via the protection signal supply path. Also, the drive control unit 460 deactivates supply of the drive signal ϕ34 via the activation signal supply path. The drive control unit 460 may (i) supply the drive signal ϕ34 for making the switching element 354 turned off to the switching element 354 via the protection signal supply path and then (ii) deactivate supply of the drive signal ϕ34 via the activation signal supply path.

Specifically, the drive control unit 460 generates the control signal ϕ52 for causing the transistor 442 to undergo a turn-off operation. The drive control unit 460 may generate the control signal ϕ54 for causing the transistor 444 to undergo a turn-off operation. Also, the drive control unit 460 generates the control signal ϕ56 such that operation of the transistor 446 results in generation of the drive signal ϕ34 for causing the switching element 354 to undergo a turn-off operation. Thereby, an effect similar to that in the second operation example is obtained. In addition, while some abnormality is occurring to the balance correcting unit 232, the transistor 442 can be protected promptly.

According to another example, if having received the operation control signal ϕ38, the drive control unit 460 determines to deactivate an equalization operation of the balance correcting unit 232. Thereafter, the drive control unit 460 controls the drive signal supply unit 420 and the drive signal supply unit 440 according to the second operation example.

Figure 5:
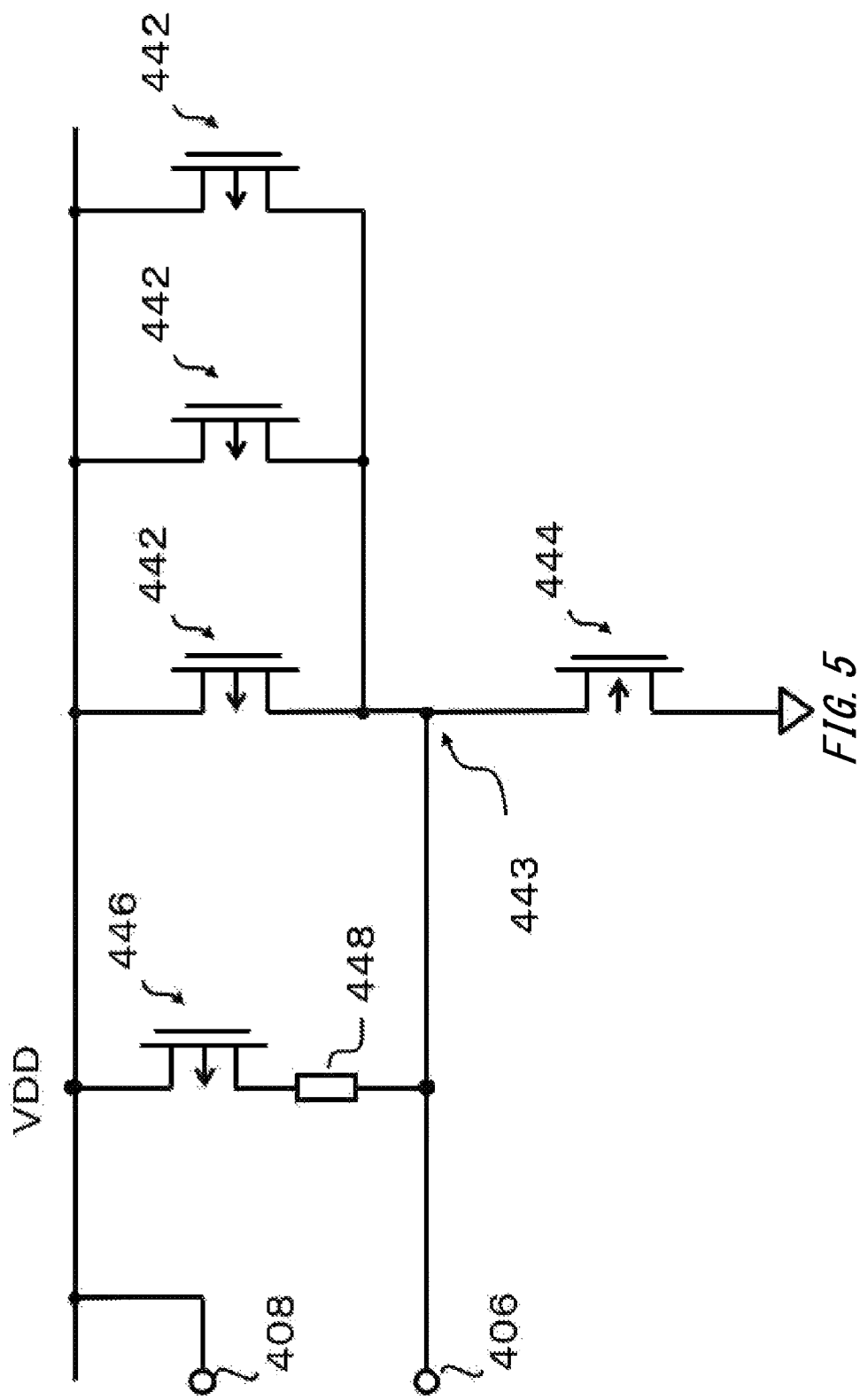
FIG. 5 schematically shows one example of the internal configuration of a drive signal supply unit 540.

FIG. 5 schematically shows one example of the internal configuration of a drive signal supply unit 540. According to the present embodiment, the drive signal supply unit 540 is different from the drive signal supply unit 440 in that it has a plurality of the transistors 442 disposed in parallel in the activation signal supply path. In other respects, it may have the same configuration as that of the drive signal supply unit 440. Thereby, even if the ON-resistance of the transistors 442 and the ON-resistance of the transistor 446 are equal to each other, a "value of a combined resistance of a wire of the protection signal supply path and one or more elements disposed in the protection signal supply path" can be made greater than a "value of a combined resistance of a wire of the activation signal supply path and one or more elements disposed in the activation signal supply path". In a similar manner to the present embodiment, the drive signal supply unit 420 may also have a plurality of the transistors 422 disposed in parallel in the activation signal supply path.

Figure 6:
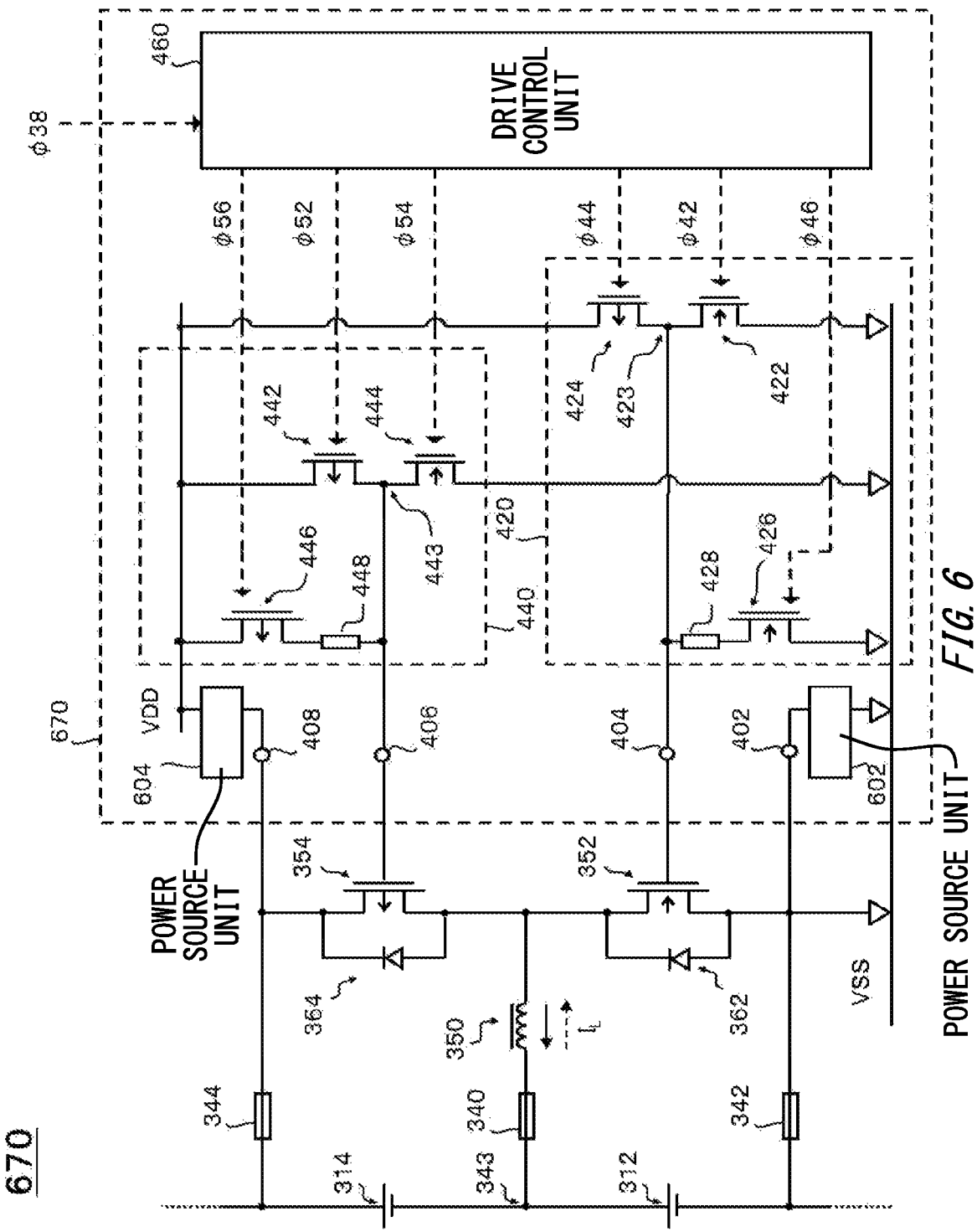
FIG. 6 schematically shows one example of the internal configuration of an equalization control unit 670.
Figure 7:
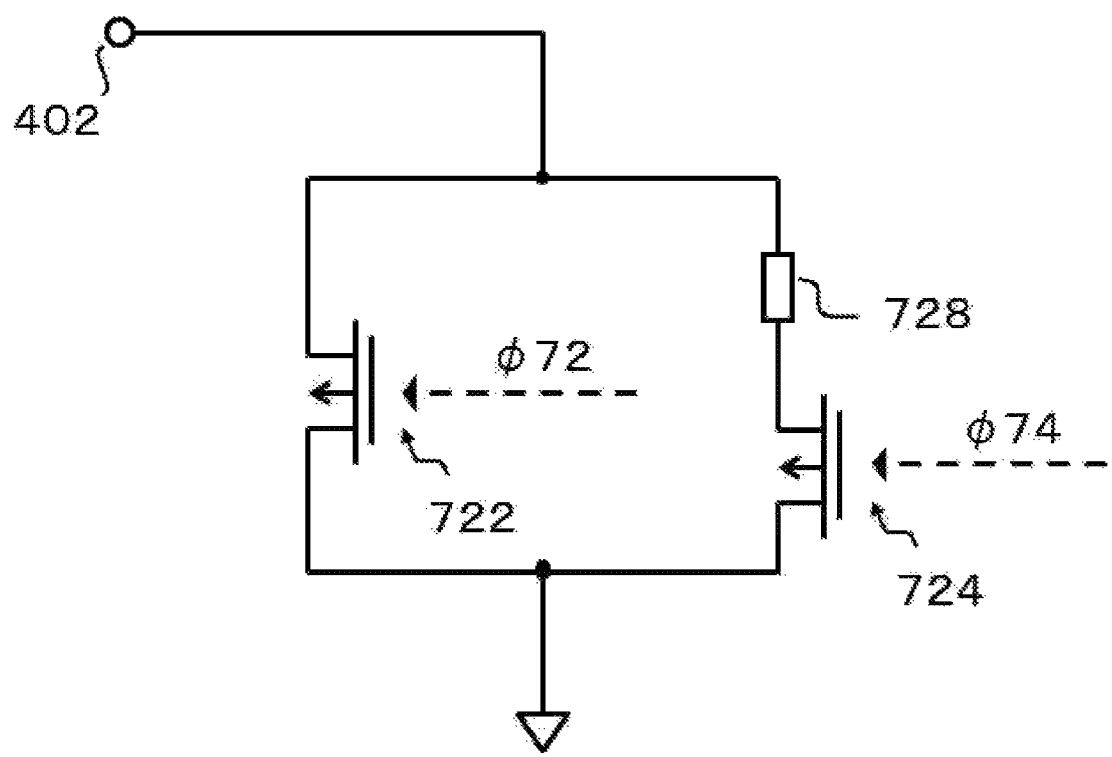
FIG. 7 schematically shows one example of the internal configuration of a power source unit 602.
Figure 8:
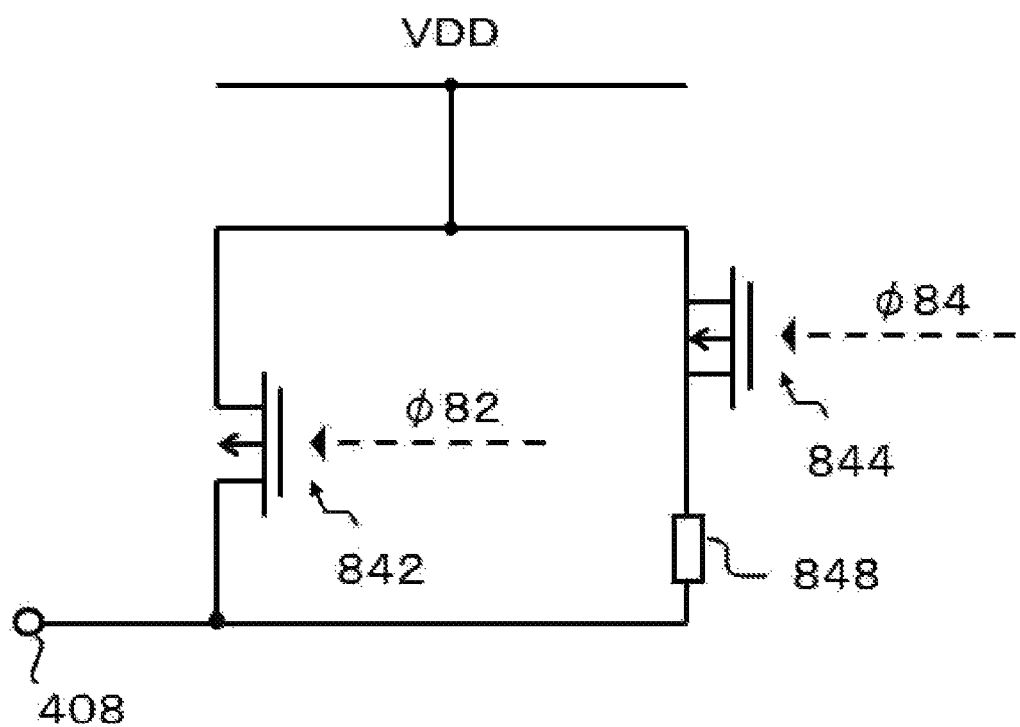
FIG. 8 schematically shows one example of the internal configuration of a power source unit 604.

Using FIG. 6, FIG. 7 and FIG. 8, other examples of equalization control units are explained. FIG. 6 schematically shows one example of the internal configuration of an equalization control unit 670. FIG. 7 schematically shows one example of the internal configuration of a power source unit 602. FIG. 8 schematically shows one example of the internal configuration of a power source unit 604.

According to the present embodiment, it is different from the equalization control unit 370 in that it has the power source unit 602 and the power source unit 604. In other respects, it may have the same configuration as that of the equalization control unit 370. The configuration of the power source units is not limited to those of the power source unit 602 and the power source unit 604. In another embodiment, the power source units may be variable power sources.

In the present embodiment, in the power source unit 602, a voltage or potential input to the VSS terminal 402 provides the reference potential VSS via the transistor 722 and the transistor 724 disposed in parallel. The path from the VSS terminal 402 through the transistor 724 to the reference potential VSS has a resistance 728 disposed therein for making the resistance value of the path greater than the resistance value of the path from the VSS terminal 402 through the transistor 722 to the reference potential VSS. The transistor 722 may operate based on a control signal ϕ72 from the drive control unit 460. The transistor 724 may operate based on a control signal ϕ74 from the drive control unit 460.

In the present embodiment, if the balance correcting unit 232 executes an equalization operation, when an abnormality of the balance correcting unit 232 is not detected, the drive control unit 460 generates the control signal ϕ72 and the control signal ϕ74 to turn on the transistor 722 and turn off the transistor 724. On the other hand, (i) if the balance correcting unit 232 has deactivated its equalization operation or (ii) the drive control unit 460 received, from the module control unit 390, the operation control signal ϕ38 including information indicating that some abnormality related to the balance correcting unit 232 was detected, the control signal ϕ72 and the control signal ϕ74 are generated to turn off the transistor 722, and turn on the transistor 724. Thereby, a potential, voltage or current for generating the drive signal ϕ32 and the drive signal ϕ34 can be reduced.

In the present embodiment, in the power source unit 604, a voltage or potential input to the VDD terminal 408 provides the power source voltage VDD via a transistor 842 and a transistor 844 disposed in parallel. The path from the VDD terminal 408 through the transistor 844 to the power source voltage VDD has a resistance 848 disposed therein for making the resistance value of the path greater than the resistance value of the path from the VDD terminal 408 through the transistor 842 to the power source voltage VDD. The transistor 842 may operate based on a control signal ϕ82 from the drive control unit 460. The transistor 844 may operate based on a control signal ϕ84 from the drive control unit 460.

In the present embodiment, if the balance correcting unit 232 executes an equalization operation, when an abnormality of the balance correcting unit 232 is not detected, the drive control unit 460 generates the control signal φ82 and the control signal φ84 to turn on the transistor 842 and turn off the transistor 844. On the other hand, (i) if the balance correcting unit 232 has deactivated its equalization operation or (ii) the drive control unit 460 received, from the module control unit 390, the operation control signal φ38 including information indicating that some abnormality related to the balance correcting unit 232 was detected, the control signal φ82 and the control signal φ84 are generated to turn off the transistor 842 and turn on the transistor 844. Thereby, a potential, voltage or current for generating the drive signal φ32 and the drive signal φ34 can be reduced.

In this case, the drive signal supply unit 420 may not include one of or both the transistor 426 and the resistance 428. Also, the drive signal supply unit 440 may not include one of or both the transistor 446 and the resistance 448. That is, the present specification discloses the following Item A.

[Item A] A control device that controls a balance correcting device to equalize voltages of a first electric storage cell and a second electric storage cell that are connected in series, wherein the balance correcting device has:

a transporting device for transporting energy between the first electric storage cell and the second electric storage cell; and a switching element that switches an electrical connection relationship between (i) at least either the first electric storage cell or the second electric storage cell and (ii) the transporting device, the control device includes:

a power source unit that provides a potential, voltage or current for generating a drive signal of the switching element; and a first path for: electrically connecting (i) the power source unit and (ii) a receiving unit that receives the drive signal in the switching element; and supplying the drive signal to the switching element, and if having received, from an abnormality detecting unit that detects an abnormality has occurred to the balance correcting device, a signal indicating that an abnormality has been detected, the power source unit reduces a voltage or current for generating the drive signal.

While the embodiments of the present invention have been described, the technical scope of the invention is not limited to the above described embodiments. It is apparent to persons skilled in the art that various alterations and improvements can be added to the embodiments. Also, matters explained with reference to a particular embodiment can be applied to other embodiments unless such application causes a technical contradiction. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

32: drive signal; 34: drive signal; 36: signal; 38: operation control signal; 42: control signal; 44: control signal; 46: control signal; 52: control signal; 54: control signal; 56: control signal; 72: control signal; 74: control signal; 82: control signal; 84: control signal; 100: device; 102: motor; 110: electric storage pack; 112: terminal; 114: terminal; 116: protection circuit; 120: electric storage module; 202: terminal; 204: terminal; 210: assembled battery; 212: electric storage cell; 214: electric storage cell; 216: electric storage cell; 218: electric storage cell; 232: balance correcting unit; 234: balance correcting unit; 236: balance correcting unit; 243: connection point; 245: connection point; 247: connection point; 330: operation circuit; 340: fuse; 342: fuse; 344: fuse; 345: connection point; 350: inductor; 352: switching element; 354: switching element; 362: diode; 364: diode; 370: equalization control unit; 380: voltage monitoring unit; 382: voltage detecting unit; 384: voltage detecting unit; 386: difference detecting unit; 390: module control unit; 402: VSS terminal; 404: drive signal terminal; 406: drive signal terminal; 408: VDD terminal; 420: drive signal supply unit; 422: transistor; 423: connection point; 424: transistor; 426: transistor; 428: resistance; 440: drive signal supply unit; 442: transistor; 443: connection point; 444: transistor; 446: transistor; 448: resistance; 460: drive control unit; 540: drive signal supply unit; 602: power source unit; 604: power source unit; 670: equalization control unit; 722: transistor; 724: transistor; 728: resistance; 842: transistor; 844: transistor; 848: resistance

What is claimed is:

1. A control device that controls a balance correcting device to equalize voltages of a first electric storage cell and a second electric storage cell that are connected in series, wherein the balance correcting device has:

a transporting device for transporting energy between the first electric storage cell and the second electric storage cell; and a switching element that switches an electrical connection relationship between (i) at least either the first electric storage cell or the second electric storage cell and (ii) the transporting device, the control device comprises:

a first path for: electrically connecting (i) a power source unit or reference potential that provides a potential, voltage or current for generating a drive signal of the switching element and (ii) a receiving unit that receives the drive signal in the switching element; and supplying the drive signal to the switching element; and a second path for: electrically connecting (i) the power source unit or the reference potential and (ii) the receiving unit; and supplying the drive signal to the switching element, and (i) a value of a combined resistance of a wire of the second path and one or more elements disposed in the second path is greater than (ii) a value of a combined resistance of a wire of the first path and one or more elements disposed in the first path.

2. The control device according to claim 1, further comprising a first switching unit that (i) is disposed in the first path, and (ii) switches, in the first path, an electrical connection relationship between the power source unit or the reference potential and the receiving unit.

3. The control device according to claim 2, further comprising a control signal generating unit that generates a first control signal for controlling operation of the first switching unit, wherein
if the balance correcting device executes an equalization operation, the control signal generating unit generates the first control signal for controlling the first switching unit such that operation of the first switching unit results in generation of the drive signal for switching an ON-state and an OFF-state of the switching element.

4. The control device according to claim 3, further comprising a second switching unit that (i) is disposed in the second path, and (ii) switches, in the second path, an electrical connection relationship between the power source unit or the reference potential and the receiving unit, wherein
the control signal generating unit further generates a second control signal for controlling operation of the second switching unit, and
if the balance correcting device deactivates an equalization operation, the control signal generating unit generates:
the first control signal for controlling the first switching unit such that operation of the first switching unit results in generation of the drive signal for making the switching element turned off; and
the second control signal for controlling the second switching unit such that operation of the second switching unit results in generation of the drive signal for making the switching element turned off.

5. The control device according to claim 4, wherein the control signal generating unit:
generates the first control signal for controlling the first switching unit such that operation of the first switching unit results in generation of the drive signal for making the switching element turned off, and then
generates the first control signal for controlling the first switching unit such that electrical connection established by the first switching unit between the power source unit or the reference potential and the receiving unit is disconnected in a state where the drive signal for making the switching element turned off as a result of operation of the second switching unit is being generated.

6. The control device according to claim 4, wherein the control signal generating unit generates the second control signal for controlling the second switching unit such that operation of the first switching unit results in generation of the drive signal for making the switching element turned off, and then operation of the second switching unit results in generation of the drive signal for making the switching element turned off.

7. The control device according to claim 6, wherein a period of time after operation of the first switching unit results in generation of the drive signal for making the switching element turned off and until operation of the second switching unit results in generation of the drive signal for making the switching element turned off is set based on a period of time after operation of the first switching unit results in generation of the drive signal for making the switching element turned off and until a state of the balance correcting device is stabilized.

8. The control device according to claim 3, further comprising a second switching unit that (i) is disposed in the second path, and (ii) switches, in the second path, an electrical connection relationship between the power source unit or the reference potential and the receiving unit, wherein
the control signal generating unit further generates a second control signal for controlling operation of the second switching unit,
if having received, from an abnormality detecting unit that detects that an abnormality has occurred to the balance correcting device, a signal indicating that the abnormality has been detected, the control signal generating unit generates:
the first control signal for controlling the first switching unit such that electrical connection established by the first switching unit between the power source unit or the reference potential and the receiving unit is disconnected; and
the second control signal for controlling the second switching unit such that operation of the second switching unit results in generation of the drive signal for making the switching element turned off.

9. The control device according to claim 4, wherein
the first switching unit and the second switching unit are transistors, and
an ON-resistance of the second switching unit is greater than an ON-resistance of the first switching unit.

10. The control device according to claim 8, wherein
the first switching unit and the second switching unit are transistors, and
an ON-resistance of the second switching unit is greater than an ON-resistance of the first switching unit.

11. The control device according to claim 2, comprising a plurality of the first switching units disposed in parallel in the first path.

12. The control device according to claim 1, wherein if having received, from an abnormality detecting unit that detects an abnormality has occurred to the balance correcting device, a signal indicating that the abnormality has been detected, the power source unit reduces a voltage or current for generating the drive signal.

13. A balance correcting system comprising:
the control device according to claim 1; and
the balance correcting device.

14. An electric storage system comprising:
the balance correcting system according to claim 13; and
the first electric storage cell and the second electric storage cell.

15. A device comprising:
the electric storage system according to claim 14; and
at least either (i) a load that consumes electrical power supplied from the electric storage system or (ii) a charging facility for supplying electrical power from the electric storage system to another instrument.

16. A control device that controls a balance correcting device to equalize voltages of a first electric storage cell and a second electric storage cell that are connected in series, wherein
the balance correcting device has:
a transporting device for transporting energy between the first electric storage cell and the second electric storage cell; and
a switching element that switches an electrical connection relationship between (i) at least either the first electric storage cell or the second electric storage cell and (ii) the transporting device,
the control device comprises:

a power source unit that provides a potential, voltage or current for generating a drive signal of the switching element; and a first path for: electrically connecting (i) the power source unit and (ii) a receiving unit that receives the drive signal in the switching element; and supplying the drive signal to the switching element, and if having received, from an abnormality detecting unit that detects an abnormality has occurred to the balance correcting device, a signal indicating that an abnormality has been detected, the power source unit reduces a voltage or current for generating the drive signal.

17. A balance correcting system comprising:

the control device according to claim 16; and the balance correcting device.

18. An electric storage system comprising:

the balance correcting system according to claim 17; and the first electric storage cell and the second electric storage cell.

19. A device comprising:

the electric storage system according to claim 18; and at least either (i) a load that consumes electrical power supplied from the electric storage system or (ii) a charging facility for supplying electrical power from the electric storage system to another instrument.

* * * * *